(12) United States Patent
Hosoya et al.

(10) Patent No.: US 12,536,101 B2
(45) Date of Patent: Jan. 27, 2026

(54) COMPUTER SYSTEM AND METHOD EXECUTED BY COMPUTER SYSTEM

(71) Applicant: Hitachi, Ltd., Tokyo (JP)

(72) Inventors: Mutsumi Hosoya, Tokyo (JP); Norio Shimozono, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 50 days.

(21) Appl. No.: 18/592,777

(22) Filed: Mar. 1, 2024

(65) Prior Publication Data

US 2025/0147883 A1 May 8, 2025

(30) Foreign Application Priority Data

Nov. 2, 2023 (JP) .................................. 2023-188232

(51) Int. Cl.
*G06F 12/08* (2016.01)
*G06F 12/0802* (2016.01)

(52) U.S. Cl.
CPC ................................ *G06F 12/0802* (2013.01)

(58) Field of Classification Search
CPC .................................................. G06F 12/0802
See application file for complete search history.

(56) References Cited

U.S. PATENT DOCUMENTS

2001/0049771 A1* 12/2001 Tischler ............... G06F 12/121
  711/E12.07
2011/0022574 A1* 1/2011 Hansen ................ G06F 16/10
  718/1
2019/0265904 A1 8/2019 Nakamura et al.

FOREIGN PATENT DOCUMENTS

JP 2019-149077 A 9/2019

* cited by examiner

*Primary Examiner* — Jae U Yu
(74) *Attorney, Agent, or Firm* — Volpe Koenig

(57) ABSTRACT

One object of the disclosure is to reduce a capacity of cached data, reduce a transfer volume, or reduce a management cost. One aspect of the disclosure is a computer system including a storage control unit and a storage apparatus. The storage control unit receives a notification of information on an operation mode determined by an operation mode determination unit based on processing executed by a processing execution unit. When an access request is received via a virtual volume from the processing execution unit in a case where target data is not stored in a cache volume, the storage control unit executes an access to a real volume. The storage control unit controls the cache volume based on the information on the operation mode.

6 Claims, 22 Drawing Sheets

FIG. 14

ATTRIBUTE TABLE (FOR SERVICE) 214a (1400)

| SERVICE (MICROSERVICE) | OPERATION MODE DURING READ ACCESS | OPERATION MODE DURING WRITE ACCESS |
|---|---|---|
| CATALOG SERVICE A | OFF MODE OF CACHE VOLUME | OFF MODE OF CACHE VOLUME |
| ETL SERVICE B | OFF MODE OF CACHE VOLUME | ON MODE OF CACHE VOLUME |
| TYPE 1 ANALYSIS SERVICE C | ON MODE OF CACHE VOLUME | ON MODE OF CACHE VOLUME |
| TYPE 2 ANALYSIS SERVICE D (MACHINE LEARNING) | ON MODE OF CACHE VOLUME | ON MODE OF CACHE VOLUME |
| MODEL OUTPUT SERVICE E | PURGE MODE UNRELATED TO READ ACCESS AND WRITE ACCESS ||

*FIG. 15*

ATTRIBUTE TABLE (FOR VOLUME) 214b (1500)

| VOLUME | OPERATION MODE DURING READ ACCESS | OPERATION MODE DURING WRITE ACCESS |
|---|---|---|
| CATALOG VOLUME α (META INFORMATION) | OFF MODE OF CACHE VOLUME | OFF MODE OF CACHE VOLUME |
| VIRTUAL LAKE β (NON-STRUCTURED DATA) | OFF MODE OF CACHE VOLUME | ON MODE OF CACHE VOLUME |
| VIRTUAL MART γ (STRUCTURED DATA) | ON MODE OF CACHE VOLUME | ON MODE OF CACHE VOLUME |
| WORK VOLUME δ (TEMPORARY VOLUME FOR ANALYSIS) | ON MODE OF CACHE VOLUME | ON MODE OF CACHE VOLUME |
| MODEL VOLUME ε (LEARNING MODEL) | PURGE MODE UNRELATED TO READ ACCESS AND WRITE ACCESS | |

FIG. 20

CONVERSION TABLE 231 (2000) (PAGE UNIT MANAGEMENT)

| VIRTUAL VOLUME PAGE | REAL VOLUME PAGE | CACHE VOLUME PAGE |
|---|---|---|
| V-A | R-A | C-A |
| V-B | R-B | (NO PAGE IN CACHE VOLUME) |
| V-C | R-C | C-C |
| V-D | R-D | C-D |
| V-E | R-E | (NO PAGE IN CACHE VOLUME) |

COMPUTER SYSTEM AND METHOD EXECUTED BY COMPUTER SYSTEM

BACKGROUND OF THE INVENTION

1. Field of the Invention

The disclosure relates to a control technique of a storage system (for example, a hybrid cloud collaboration storage system) constructed between systems interconnected by a network.

2. Description of Related Art

Digital transformation is widely recognized as a business competition axis, and a movement to create a new value by utilizing data maintained by a company has become active. In data analysis based on data utilization, a cloud service (for example, a public cloud) is often used. Meanwhile, target data to be analyzed is generally present in an on-premise environment (or a private cloud) of each company. Therefore, there is an increasing need to analyze target data to be analyzed present in an on-premise environment (or a private cloud) by a cloud service (for example, a public cloud).

PTL 1 discloses one related art related to analyzing target data to be analyzed present in an on-premise environment (or a private cloud) by a cloud service (for example, a public cloud). PTL 1 discloses the related art in which, in order to efficiently access data present in the on-premise environment (or the private cloud) from a cloud environment (public cloud), a copy of the data present in the on-premise environment (or the private cloud) is maintained in the cloud environment (public cloud) in units of pages.

Such a technique is not limited to the case where the target data to be analyzed present in the on-premise environment (or the private cloud) is analyzed by the cloud service (for example, the public cloud) as described above, and more generally, there is a need for a system to efficiently access data present in another system among systems interconnected by a network.

CITATION LIST

Patent Literature

PTL 1: JP2019-149077A

SUMMARY OF THE INVENTION

In a technique of maintaining a copy of data (so-called data caching technique) including the related art disclosed in PTL 1, in many cases, selection of data to be maintained in a cache is performed based on a history of a past access to the data. Therefore, it is often not easy to specify data required at present or in the future. In addition, it is often not easy to specify a timing when the data is required. When the specification of the data and the specification of the timing as described above are not appropriately performed, data that is less likely to be reused and data that is not necessarily cached due to a reason that an elapsed time until reuse is long may be cached, which may cause an increase in a capacity of cached data and an increase in a data transfer volume. When data that is not accessed after a certain time point is still retained in the cache, a cost for managing the data may increase. The situation described above may cause excessive consumption of resources and electric energy.

In view of the above, one object of the disclosure is to reduce a capacity of cached data, reduce a data transfer volume for caching, or reduce a cost for managing cached data.

In order to achieve at least one of the objects, the disclosure may have the following features, for example.

One aspect of the disclosure is a computer system including a storage control unit and a storage apparatus. The storage control unit provides a virtual volume to a processing execution unit configured to execute an application. The storage control unit manages data input to and output from a real volume via the virtual volume. The storage control unit implements a cache volume based on a storage area of the storage apparatus.

The storage control unit receives a notification of information on an operation mode determined by an operation mode determination unit based on processing executed by the processing execution unit. When an access request is received via the virtual volume from the processing execution unit in a case where target data of the access request is not stored in the cache volume, the storage control unit executes an access to the real volume for the target data. The storage control unit controls the cache volume based on the notified information on the operation mode.

Since the disclosure has the above-described features, the disclosure can reduce a capacity of cached data, reduce a data transfer volume for caching, or reduce a cost for managing cached data.

A method and a program for implementing the same processing as that implemented by the system can also obtain the same operational effects as those of the system.

Features that may be provided in the disclosure other than those described above and operational effects corresponding to the features are disclosed in this specification, claims, and drawings.

BRIEF DESCRIPTION OF THE DRAWINGS

FIG. 14 shows a first example of an attribute table (for service).

FIG. 15 shows a second example of the attribute table (for volume).

FIG. 20 shows a conversion table.

DESCRIPTION OF EMBODIMENTS

Figure 1:
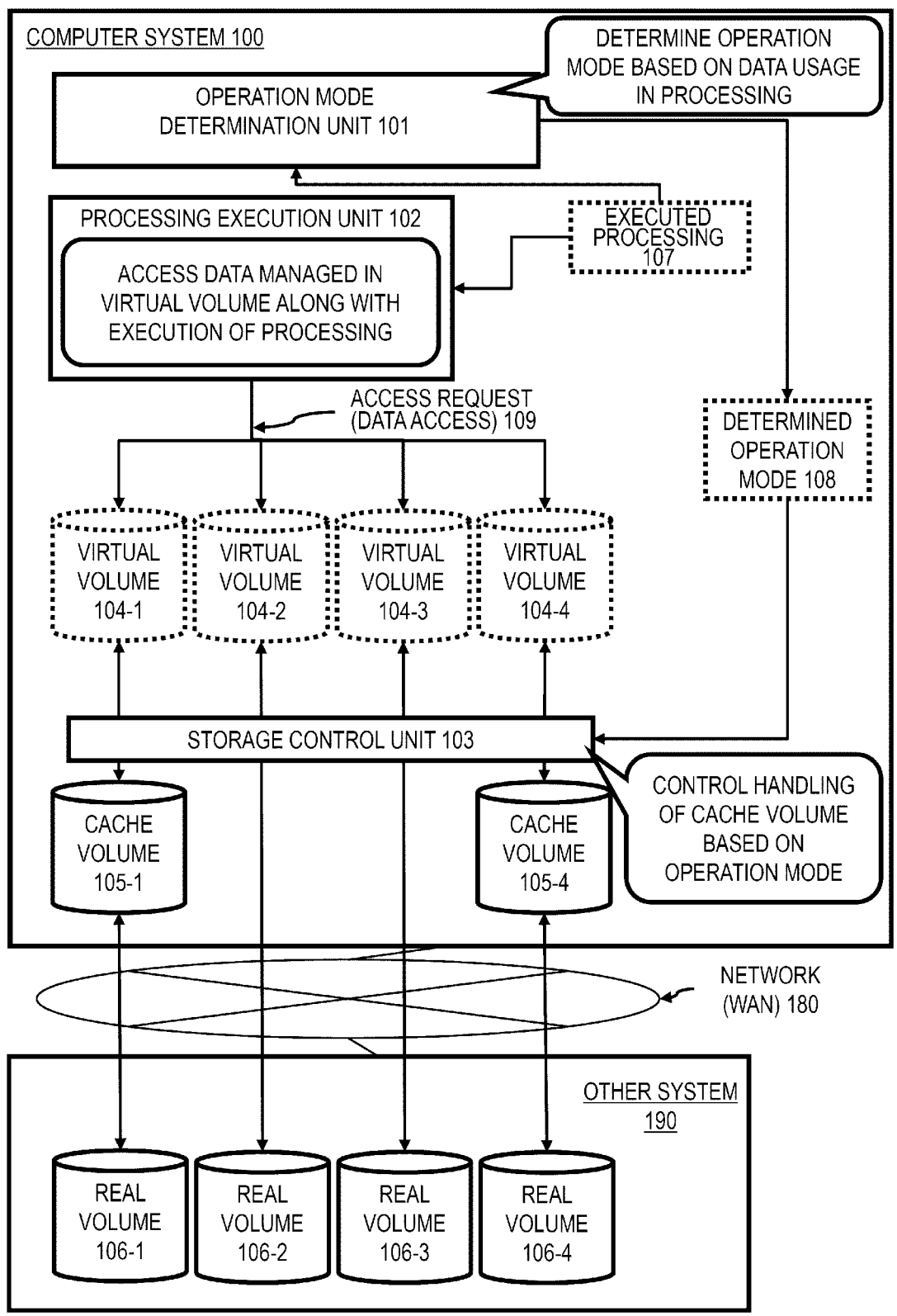
FIG. 1 shows a basic functional configuration of an embodiment of the disclosure.

Hereinafter, an embodiment of the disclosure will be described in detail with reference to the drawings. The embodiment to be described later does not limit the disclosure according to the claims, and all of various elements described in the embodiment and combinations thereof are not necessarily essential to the solution of the disclosure. The disclosure is not limited to the embodiment, and any application example that matches the idea of the disclosure is included in the technical scope of the disclosure. The following description and drawings are examples for describing the disclosure, and are omitted and simplified as appropriate for clarity of description. Unless otherwise specified, each component may be single or plural. To facilitate understanding of the disclosure, the position, size, shape, range, or the like of each component shown in the drawings may not represent an actual position, size, shape, range, or the like. Therefore, the disclosure is not necessarily limited to positions, sizes, shapes, ranges, and the like disclosed in the drawings.

Each of a system, a server, a node, an apparatus, and a functional unit in the disclosure may be integrated into one piece of hardware, or may be divided into a plurality of parts and the parts may each play a role in cooperation with each other. Several systems, servers, nodes, apparatuses, or functional units may be integrated in terms of hardware.

Figure 9:
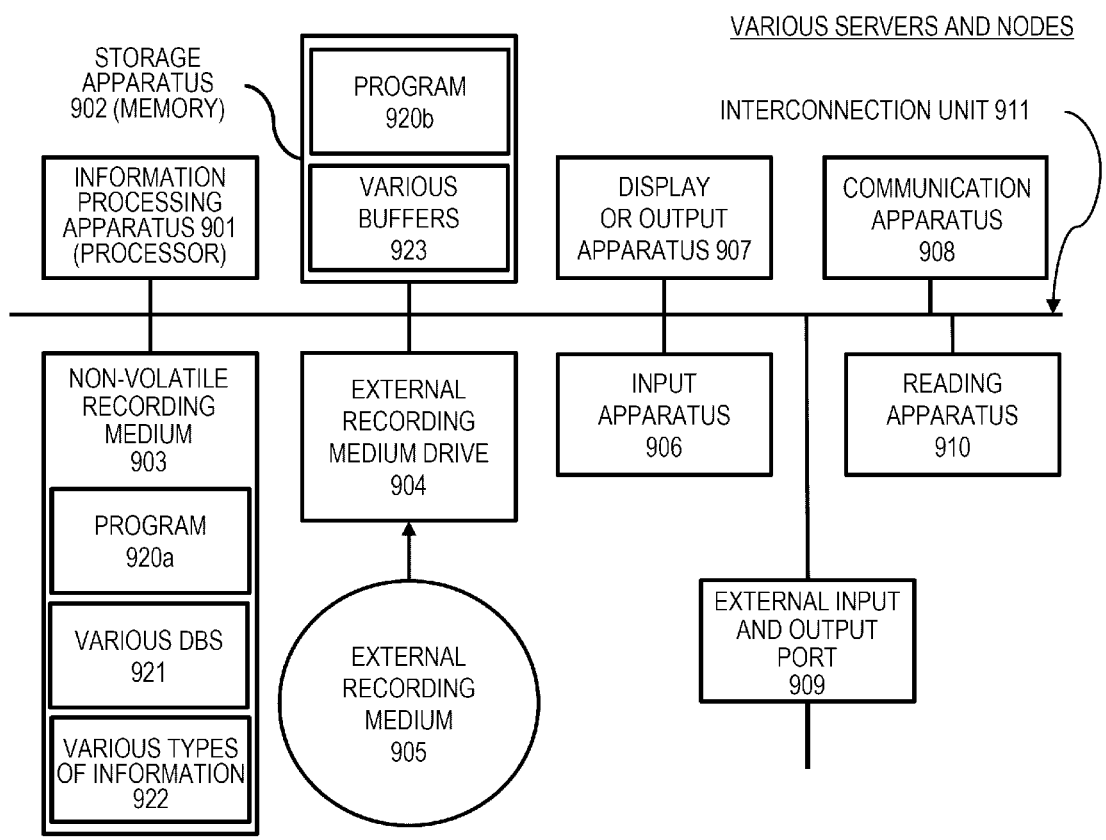
FIG. 9 shows an example of a computer architecture.

Each of the system, the server, the node, the apparatus, and the functional unit may be implemented by causing a computer (as shown in FIG. 9) to execute software (program). A part of functions of the system, the server, the node, the apparatus, or the functional unit may be implemented by hardware (for example, hardwired logic or FPGA), and the remaining functions may be implemented by executing software (program). All of the functions of the system, the server, the node, the apparatus, or the functional unit may be implemented by hardware. A part or all of steps shown in flowcharts described in the disclosure may be implemented by hardware.

One or a plurality of the systems, the servers, the nodes, the apparatuses, or the functional units in the disclosure may each be implemented from one or a plurality of hardware resources. Therefore, each of the system, the server, the node, the apparatus, and the functional unit in the disclosure may be virtually implemented. For example, a method of a virtual machine or a container may be used.

Software (program) in the disclosure may be included in a concept including those generally corresponding to the software such that a unique information processing system or an operation method thereof according to a purpose of use is constructed by cooperation between the software and hardware resources. That is, a program in the disclosure is not limited to a program of a specific type or aspect. The program may be recorded in a compressed format at first.

Items using the same reference numeral in a plurality of drawings are similar to each other. In each drawing that shows a flowchart, a rectangular box indicates a processing step, and a hexagonal box indicates a conditional branching step. In the drawing that shows the flowchart, "step" is abbreviated as "S". In the drawing, a database is abbreviated as "DB".

1. Basic Functional Configuration of Embodiment of Disclosure (FIG. 1)

FIG. 1 shows a basic functional configuration of the embodiment of the disclosure. Not all of the functional configuration shown in FIG. 1 is essential in the disclosure. Addition of a functional configuration other than the functional configuration shown in FIG. 1 is not hindered.

In FIG. 1, a computer system 100 (hereinafter, "computer system 100" is simply referred to as "system 100") can communicate with another system 190 (other system) via a network 180. The network 180 may be, for example, a WAN. The other system 190 includes a real volume 106. Four real volumes 106 are shown in FIG. 1, and the number of the real volumes 106 may be any number. The system 100 can implement a cache volume 105. Here, the cache volume 105 is used to cache data of the real volume 106 provided in the other system 190. Two cache volumes 105 are shown in FIG. 1, and the number of the cache volumes 105 may be any number.

The system 100 handles an access (access request 109) to data managed in a virtual volume 104. Specifically, when an access subject (in FIG. 1, a processing execution unit 102) in the system 100 accesses data present in the real volume 106 provided in the other system 190 or data present in the cache volume 105 provided in the system 100 (access request 109), the virtual volume 104 may serve as an access target. In the example in FIG. 1, for example, when the processing execution unit 102 in the system 100 accesses data present in a real volume 106-1 in the other system 190 or a cache volume 105-1 in the system 100, the processing execution unit 102 may set a virtual volume 104-1 as the access target. Similarly, for example, when the processing execution unit 102 accesses data present in a real volume 106-2, the processing execution unit 102 may set a virtual volume 104-2 as the access target.

As shown in FIG. 1, for each virtual volume 104, it may be determined whether to copy (cache), into the cache volume 105, data present in the real volume 106 corresponding to the virtual volume 104. In the example in FIG. 1, data present in real volumes 106-1 and 106-4 may be copied (cached) into cache volumes 105-1 and 105-4, respectively. Meanwhile, data present in real volumes 106-2 and 106-3 is not copied (cached) into the cache volume 105 implemented in the system 100. For each real volume 106 (virtual volume 104), whether caching by the cache volume 105 is used may be determined based on an operation mode 108. Here, for a certain virtual volume 104, when data present in the real volume 106 corresponding to the virtual volume 104 is permitted to be copied (cached) into the cache volume 105, the certain virtual volume 104 may be referred to as a "cache-enabled virtual volume".

In FIG. 1, among data present in the real volume 106-1 and the real volume 106-4, the system 100 can execute an access to data whose copy is present in the cache volume 105-1 or the cache volume 105-4 (cached data) at high speed (as compared with a case of accessing the real volume 106-1 or the real volume 106-4).

As shown in FIG. 1, the system 100 includes, as functional units, an operation mode determination unit 101, the processing execution unit 102, and a storage control unit 103.

The operation mode determination unit 101 determines the operation mode 108 based on usage of data in processing ("executed processing 107" in FIG. 1) executed by the processing execution unit 102. The operation mode determination unit 101 directly or indirectly transmits (performs a notification of) information on the operation mode 108 to the storage control unit 103. The storage control unit 103 receives the information on the operation mode 108.

Along with execution of the processing 107, the processing execution unit 102 executes an access (access request 109) to the data managed in the virtual volume 104.

The storage control unit 103 provides the virtual volume 104 to the processing execution unit 102 that executes an application. The storage control unit 103 manages data input to and output from the real volume 106 via the virtual volume 104. The storage control unit 103 implements the cache volume 105 based on a storage area of a storage apparatus (or a recording apparatus) provided in the system 100.

The storage control unit 103 controls the access (access request 109) to the data managed in the virtual volume 104 (for example, accessed by the processing execution unit 102). When the access request 109 is received via the virtual volume 104 from the processing execution unit 102 in a case where target data of the access request is not stored in the cache volume 105, the storage control unit 103 executes an access to the real volume 106 for the target data.

The storage control unit 103 controls handling of the cache volume 105 based on information on the operation mode 108 corresponding to the processing 107 executed by the processing execution unit 102.

For example, in a case where the operation mode 108 corresponding to the processing 107 is an operation mode in which caching is used (a cache mode or an ON mode to be described later), when a read access or a write access to the data managed in the virtual volume 104 is executed from the processing execution unit 102, the storage control unit 103 may perform control to cache, into the cache volume 105 as necessary, data present in the real volume 106 corresponding to the virtual volume 104 (control to retain data read from the real volume 106 in the cache volume 105).

On the other hand, in a case where the operation mode 108 corresponding to the processing 107 is an operation mode in which caching is not used (a remote mode or an OFF mode to be described later), when the read access or the write access to the data managed in the virtual volume 104 is executed from the processing execution unit 102, the storage control unit 103 may perform control to prevent caching, into the cache volume 105, the data present in the real volume 106 corresponding to the virtual volume 104 (control to prevent retaining the data read from the real volume 106 in the cache volume 105).

Further, when an operation mode in which data in the cache volume 105 is erased after writing back (destaging) the data present in the cache volume 105 to the real volume 106 (a purge mode to be described later) is specified, the storage control unit may perform destaging and erase the data in the cache volume 105 (control to prevent retaining, in the cache volume 105, the data stored in the cache volume 105). Details of the operation modes will be described later.

The system 100 according to the disclosure has the functional configuration as described above, and thus can obtain the effect described in [SUMMARY OF THE INVENTION].

2. Detailed Functional Configuration of Embodiment of Disclosure (FIG. 2)

Figure 2:
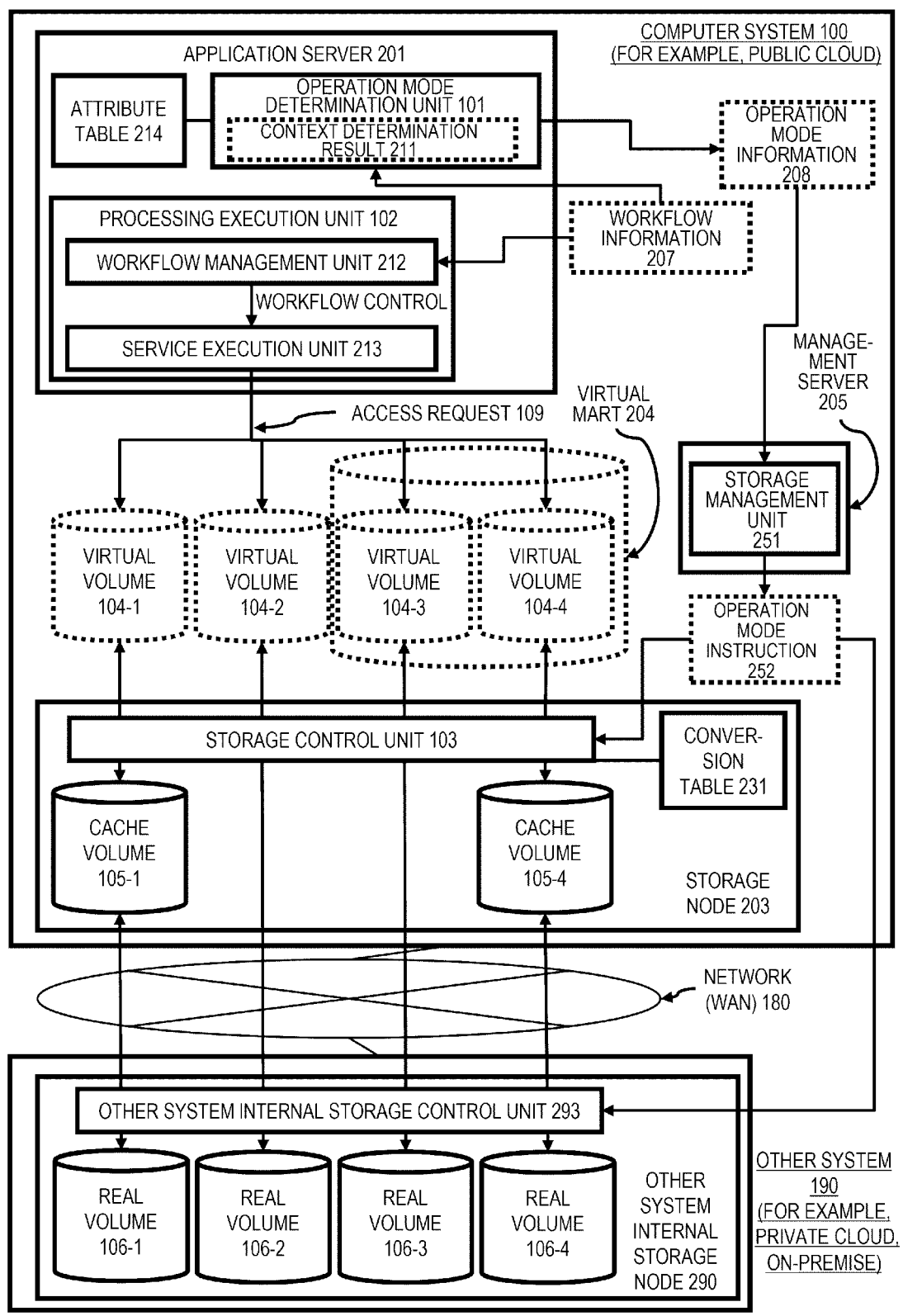
FIG. 2 shows a detailed functional configuration of the embodiment of the disclosure.

FIG. 2 shows a detailed functional configuration of the embodiment of the disclosure. Not all of the functional configuration shown in FIG. 2 is essential in the disclosure. Addition of a functional configuration other than the functional configuration shown in FIG. 2 is not hindered. Repeated description of matters already described with reference to FIG. 1 may be omitted below.

In FIG. 2, the system 100 that executes an access via the virtual volume 104 may be a public cloud, and the other system 190 that includes the real volume 106 may be an on-premise environment or a private cloud. In this way, the disclosure can be used for the public cloud to perform data analysis on target data to be analyzed maintained in the on-premise environment or the private cloud.

The system 100 may include an application server 201, a storage node 203, and a management server 205. The operation mode determination unit 101 and the processing execution unit 102 may be functional units implemented in the application server 201. The cache volume 105 may be provided in the storage node 203. The storage control unit 103 may be a functional unit implemented in the storage node 203. The management server 205 may include a storage management unit 251 as a functional unit. The other system 190 may include another system internal storage node 290. The real volume 106 may be provided in the other system internal storage node 290. The other system internal storage node 290 may include another system internal storage control unit 293 as a functional unit. As described above, by appropriately separating and managing each of the system, the server, the node, the volume, and the functional unit, the embodiment of the disclosure can implement functions of the disclosure while avoiding unexpected mutual interference between the system, the server, the node, the volume, and the functional unit.

At least several virtual volumes 104 handled in the system 100 may be provided in a virtual lake obtained by virtualizing a lake for handling target non-structured data to be analyzed or a virtual mart obtained by virtualizing a mart for handling target structured data to be analyzed. FIG. 2 shows an example in which a virtual volume 104-3 and a virtual volume 104-4 are provided in a virtual mart 204. In this way, it is also possible to reduce a management cost of attributes of the virtual volume 104 by including the virtual volume 104 in a larger management unit (virtual lake or virtual mart). If it is possible to reduce the management cost of the attributes of the virtual volume 104, it is also possible to reduce consumption of resources and electric energy in the system 100 or the like.

The processing execution unit 102 may include a workflow management unit 212 and a service execution unit 213 as functional units. For example, the workflow management unit 212 may be implemented as a functional unit by the application server 201 executing a workflow management program. The service execution unit 213 may be implemented as a functional unit by the application server 201 executing a service execution program.

Based on workflow information 207 in which a workflow indicating the processing 107 is described, the workflow management unit 212 manages the workflow and the service execution unit 213. The management performed by the workflow management unit 212 may include management related to execution of various services (various service programs) by the service execution unit 213, management of parameters used in the various services, and management of target data to be analyzed which is to be handled in the various services.

The workflow information 207 may include, for each processing phase in the processing 107, information for specifying a service corresponding to the phase or information for specifying data input and output in the phase. The workflow information 207 may include explicit operation mode information that explicitly specifies the operation mode 108 for each processing phase. The workflow information 207 may be represented by a graph according to an aspect of the workflow. Aspects of the workflow information 207 will be described later with reference to FIGS. 11 and 12.

The service execution unit 213 executes a service provided in the processing 107. For example, for each processing phase in the processing 107, the service execution unit 213 may execute a service corresponding to the phase. Along with execution of the service, the service execution unit 213 may execute an access (access request 109) to the data managed in the virtual volume 104 (data present in the real volume 106 or the cache volume 105). When implementing the service execution unit 213, a service program for each service type may be executed under control based on the service execution program. Alternatively, the service program for each service type may be executed without control based on the service execution program (under direct control based on the workflow management program).

If the processing execution unit 102 is as described above, the processing execution unit 102 can execute the processing 107 based on the workflow described in the workflow information 207. Based on the description of the workflow information 207, the processing execution unit 102 can execute, for each processing phase in the processing 107, a service of the phase or an access (access request 109) to data input and output in the phase.

For example, the operation mode determination unit 101 may be implemented as a functional unit by the application server 201 executing an operation mode determination program.

The operation mode determination unit 101 may determine a context of the workflow indicating the processing 107 (usage of data in processing indicated by a data flow) based on an attribute related to the processing 107 executed by (the service execution unit 213 in) the processing execution unit 102, obtain a context determination result 211, and then determine the operation mode 108 corresponding to the context (context determination result 211). Then, the operation mode determination unit 101 may notify the storage management unit 251 in the management server 205 of operation mode information 208 indicating the operation mode 108. As described above, (the cache volume 105 is not handled based on only a history of a past access,) the operation mode determination unit 101 determines usage of the data in the processing 107 as the context of the workflow indicating the processing 107. Therefore, when the processing 107 is executed, the operation mode determination unit 101 can determine the operation mode 108 related to the handling of the cache volume 105 to match data where an access is required at present or in the future and a timing when the data is required.

In order to determine the operation mode 108, the operation mode determination unit 101 may use the workflow information 207 describing the workflow indicating the processing 107 and information provided in an attribute table 214.

As described above, the workflow information 207 may include, for each processing phase in the processing 107, the information for specifying the service corresponding to the phase, the information for specifying the data input and output in the phase, and the explicit operation mode information that explicitly specifies the operation mode 108. The operation mode determination unit 101 may determine the context for each processing phase based on the above-described information provided in the workflow information 207.

Meanwhile, the attribute table 214 may include information on a type of the operation mode 108 related to the handling of the cache volume 105 according to a type of the attribute related to the processing 107. As shown in FIG. 14 to be described later, the attribute table 214 may include information on the operation mode 108 according to a type of a service executed by (the service execution unit 213 in) the processing execution unit 102. As shown in FIG. 15 to be described later, the attribute table 214 may include information on the operation mode 108 according to a type of a volume or the like accessed by (the service execution unit 213 in) the processing execution unit 102. The attribute table 214 provides a guideline (policy) for the operation mode determination unit 101 to determine the operation mode 108.

The operation mode determination unit 101 may compare, for each processing phase in the processing 107, the information for specifying the service corresponding to the phase or the information for specifying the data (volume or the like) input and output in the phase, which is provided in the workflow information 207, with the information on the operation mode 108 corresponding to the type of the service or the type of the volume, which is provided in the attribute table 214. The operation mode determination unit 101 may determine the operation mode 108 based on a result of the comparison. Alternatively, when the workflow information 207 includes, for a certain processing phase, the explicit operation mode information that explicitly specifies the operation mode 108, the operation mode determination unit 101 may determine the operation mode 108 of the certain phase by preferentially using the explicit operation mode information. In this way, when the operation mode determination unit 101 determines the operation mode 108, any one of an attribute of the service, an attribute of the input and output data (volume or the like), and the explicit specification of the operation mode can be used for each processing phase in the processing 107, and thus the determination of the operation mode 108 for each phase can be flexibly performed.

As described above, the operation mode determination unit 101 determines control of the virtual volume 104 (and the cache volume 105) in association with the workflow. Therefore, in the system 100, it is possible to optimize data arrangement and ensure performance of the access to the data while reducing a cost related to maintenance and management of the data. If it is possible to reduce the cost related to the maintenance and the management of the data, it is also possible to reduce consumption of resources and electric energy in the system 100 or the like.

The storage management unit 251 may be implemented as a functional unit by the management server 205 executing a storage management program, for example.

The storage management unit 251 is notified of the operation mode information 208 from the operation mode determination unit 101. When the notification is performed, the storage management unit 251 transmits (performs a notification of) an operation mode instruction 252, which is an instruction to apply the operation mode 108 indicated by the operation mode information 208, to the storage control unit 103 that controls an access to the cache volume 105 to which the operation mode 108 is to be applied (and the virtual volume 104 using the cache volume 105). In this way, in the embodiment of the disclosure, a method may be adopted in which the storage management unit 251 in the management server 205 receives the information (operation mode information 208) on the operation mode 108 determined by the operation mode determination unit 101, and then the storage management unit 251 sends (transmits, performs a notification of) the operation mode instruction 252 to the storage control unit 103. By adopting this method, even when the system 100 includes a plurality of application servers 201 and a plurality of storage nodes 203, (the storage management unit 251 in) the management server 205 can perform storage management in the system 100 centrally.

A modification is also possible in which the storage control unit 103 is directly notified of the information on the operation mode 108 (operation mode information 208) from the operation mode determination unit 101.

The storage control unit 103 may be implemented as a functional unit by the storage node 203 executing a storage control program, for example.

When there is an access (access request 109) to the data managed in the virtual volume 104 from (the service execution unit 213 in) the processing execution unit 102, the storage control unit 103 may first check whether access target data is present in the cache volume 105. In order to perform the check, the storage control unit 103 may refer to information in a conversion table 231.

The conversion table 231 may include, for each piece of data managed in the virtual volume 104, information on a position of the data in the real volume 106, information on presence or absence of the data in the cache volume 105, and information on a position of (a copy of) the data in the cache volume 105 (if present). By using the conversion table 231 by the storage control unit 103, it is possible to determine whether it is appropriate to access the cache volume 105 or the real volume 106 for each piece of data managed in the virtual volume 104. An aspect of the conversion table 231 will be described later with reference to FIGS. 19 and 20.

When there is an access (access request 109) to the data managed in the virtual volume 104 from (the service execution unit 213 in) the processing execution unit 102, handling in a case where the data is absent in the cache volume 105 depends on the operation mode 108 indicated by the operation mode instruction 252.

There are roughly two methods for handling in the case where the data targeted by the access request 109 is absent in the cache volume 105.

In a first method, when the data targeted by the access request 109 is absent in the cache volume 105, the storage control unit 103 executes a read access or a write access to the real volume 106 for the data, and does not stage (processing of transferring and storing a copy of the data) the data (from the real volume 106) to the cache volume 105. The "remote mode" and the "OFF mode" to be described later correspond to the first method. For example, if the first method is applied to data having a low reuse possibility or data having a long time until reuse, it is possible to reduce an amount of data staged (transferred and stored) from the real volume 106 to the cache volume 105 while preventing a disadvantage that data to be accessed is not cached.

In a second method, when the data targeted by the access request 109 is absent in the cache volume 105, the storage control unit 103 stages (processing of transferring and storing a copy of the data) the data (from the real volume 106) to the cache volume 105, and then executes a read access or a write access to the data present in the cache volume 105. The "cache mode" and the "ON mode" to be described later correspond to the second method. For example, if the second method is applied to data having a high reuse possibility and a short time until reuse, it is possible to obtain an advantage by caching data commensurate with an amount of data staged (transferred and stored) from the real volume 106 to the cache volume 105.

The operation mode instruction 252 may specify an operation mode (the purge mode to be described later) in which the data present in the cache volume 105 is erased after destaging data present in the cache volume 105 to the real volume 106 (writing back data). In this case, the storage control unit 103 may perform destaging and erase the data in the cache volume 105 regardless of the access (access request 109) to the data managed in the virtual volume 104 from (the service execution unit 213 in) the processing execution unit 102. After a certain time point (after a certain phase), if the above-described purge mode control is performed on data that is not accessed in the system 100, a possibility that data that is not necessarily stored in the cache volume 105 remains in the cache volume 105 is low, and it is expected that a data management cost is reduced. If it is possible to reduce the data management cost, it is also possible to reduce consumption of resources and electric energy related to the handling of the cache volume 105.

The other system internal storage control unit 293 may be implemented as a functional unit by the other system internal storage node 290 executing another system internal storage control program. The other system internal storage control unit 293 controls an access to the real volume 106.

In a case where a storage system crossing systems interconnected by a network is constructed by a part related to storage in the system 100 and a part related to storage in the other system 190, the other system internal storage control unit 293 and the storage control unit 103 may cooperate in any manner. For example, the operation mode instruction 252 issued by the storage management unit 251 provided in the system 100 may be transmitted not only to the storage control unit 103 but also to the other system internal storage control unit 293. In this case, in order to control the virtual volume 104 and control the real volume 106 and the cache volume 105 corresponding to the virtual volume 104 according to the operation mode 108 indicated by the operation mode instruction 252, the storage control unit 103 and the other system internal storage control unit 293 may operate in cooperation with each other.

The operation mode instruction 252 may not be sent to the other system internal storage control unit 293 in a modification as long as the storage control unit 103 is sufficient to perform control for implementing the operation mode 108 indicated by the operation mode instruction 252 and the other system internal storage control unit 293 can simply respond to a read access or a write access to data present in the real volume 106.

Figure 4:
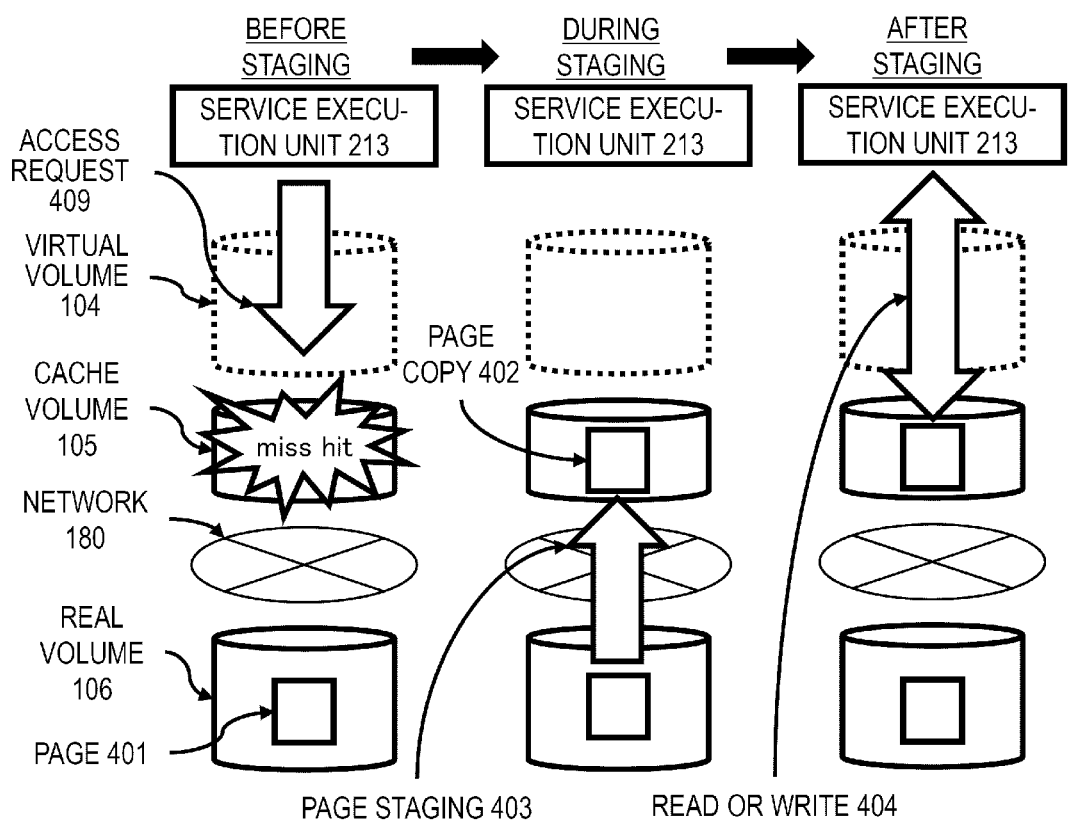
FIG. 4 shows staging.
Figure 5:
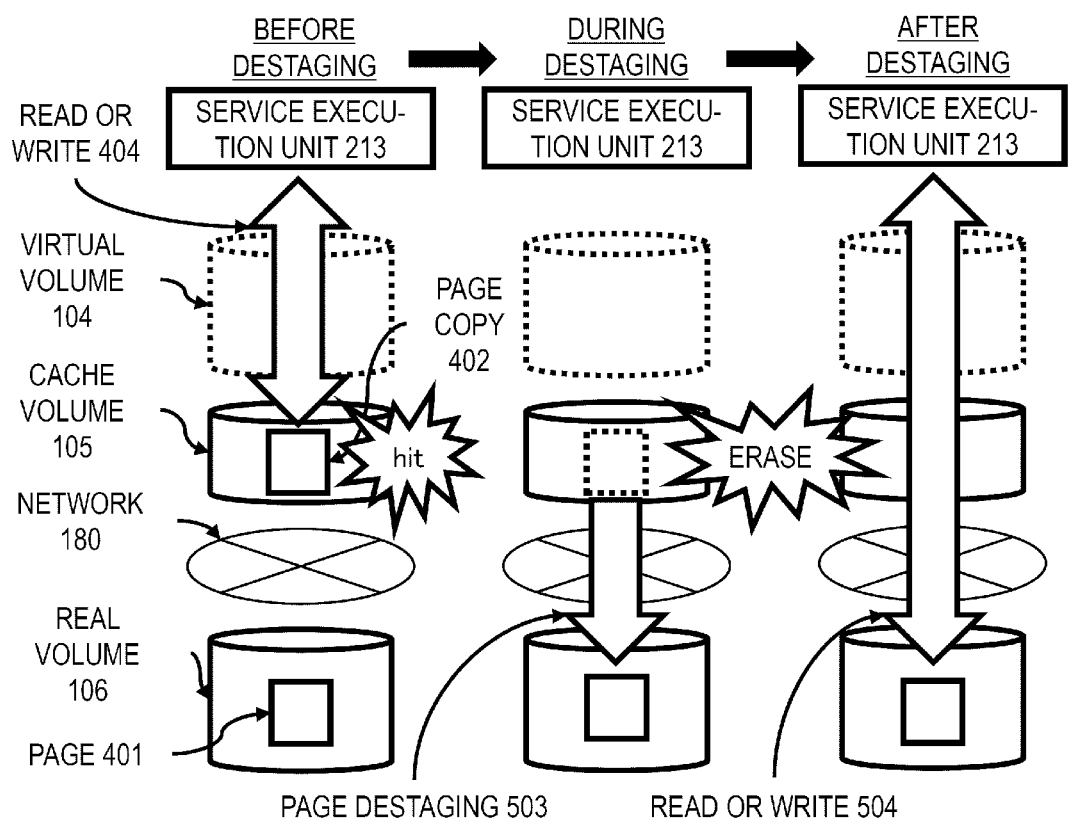
FIG. 5 shows destaging.

2.1. First Example of Processing Phase and Operation Mode (FIGS. 3, 4, and 5)

Figure 3:
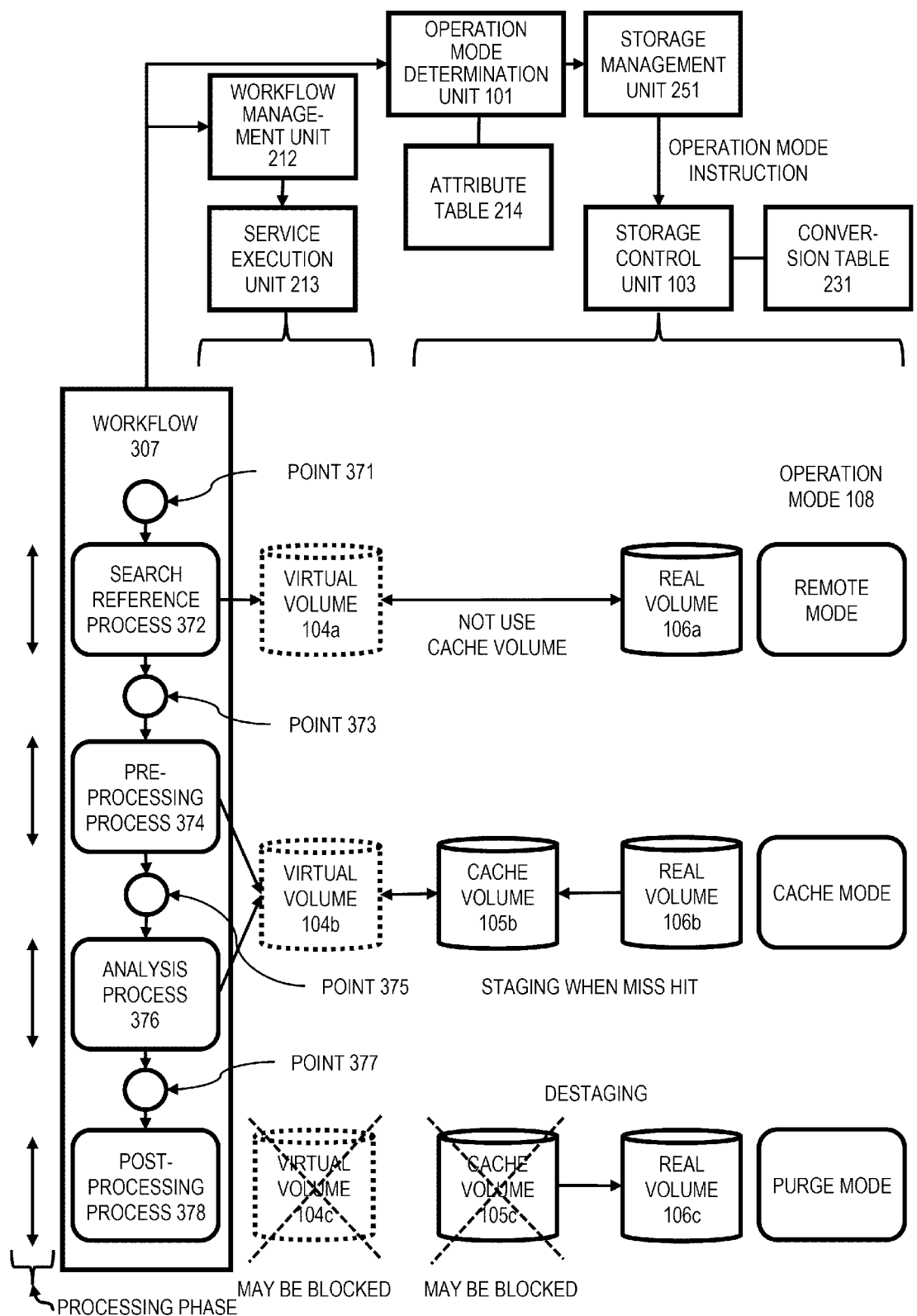
FIG. 3 shows a first example of a processing phase and an operation mode.

FIG. 3 shows a first example of the workflow indicating the processing 107, the processing phase in the processing 107, and the operation mode corresponding to the phase, which can be handled in the embodiment of the disclosure. As shown in FIG. 3, the operation mode 108, which is the "remote mode", the "cache mode", or the "purge mode", may be set for the processing phase (process) or the virtual volume 104 associated with the processing phase (process).

In the example in FIG. 3, a workflow 307 (data analysis workflow) indicating the processing 107 indicates a search reference process 372, a pre-processing process 374, an analysis process 376, and a post-processing process 378 in an order of execution. Each process indicated in the workflow 307 corresponds to each processing phase. The workflow 307 may include points 371, 373, 375, and 377 between these processes. Each point may indicate a control content on transition (start or end of the process (phase)) between processes (between phases) and a control content on repetition of the process (phase).

The search reference process 372 is a process of searching for and referring to target data to be analyzed. The search reference process 372 may be, for example, a process of searching a data lake (which manages non-structured data as the target data to be analyzed) in order to examine what data is present as the target data to be analyzed (what data is likely to be used in the analysis process 376) prior to the analysis process 376 and the like. The search reference process 372 may execute a process of collecting or adding meta information for specifying a target data group to be analyzed used in the pre-processing process 374 or the analysis process 376. (The search reference process 372 may be executed by the other system 190 (on-premise environment or private cloud) instead of the system 100 (public cloud). If the target data to be analyzed used in the analysis process 376 or the like and contents of processing to be executed on the data are known in advance, the search reference process 372 may not be executed.)

The pre-processing process 374 is a process in which processing corresponding to preparation for the analysis process 376 is executed. The pre-processing process 374 may be, for example, a process executed corresponding to pre-processing such as cleansing of the target data to be analyzed (processing of detecting damaged data or incorrect data and correcting or deleting the damaged data or incorrect data) or reshaping the target data to be analyzed.

The analysis process 376 is a process of performing data analysis and data verification. The analysis process 376 may be, for example, a process of performing certain aggregation processing. Alternatively, the analysis process 376 may be, for example, a process of training a learning model (for example, training a model parameter) by executing machine learning using the target data to be analyzed.

The post-processing process 378 is a process of performing post-processing based on a processing result of the preceding analysis process 376. The post-processing process 378 may be, for example, a process in which information (for example, a trained model parameter) related to the learning model trained in the analysis process 376 (when the analysis process 376 is the process of training the learning model) is transmitted from the system 100 (public cloud) to the other system 190 (on-premise environment or private cloud), and the information is stored in the other system 190 (on-premise environment or private cloud). Alternatively, the post-processing process 378 may be a process of using the learning model. (When the other system 190 (on-premise environment or private cloud) uses the trained learning model, the process in which the other system 190 uses the learning model may be separated from the workflow 307.)

The workflow management unit 212 refers to the workflow information 207 (workflow 307) in which each of the processes (phases) having the contents described above is described as each of workflow entities.

The workflow information 207 (workflow 307) may be directly referred to by the operation mode determination unit 101. In this case, it can be said that the operation mode determination unit 101 analyzes the workflow 307. Alternatively, the operation mode determination unit 101 may be provided with information (workflow entity) in the workflow information 207 (workflow 307) from the workflow management unit 212. In this case, the operation mode determination unit 101 determines the operation mode 108 for the processing phase corresponding to each workflow entity individually provided by the workflow management unit 212.

Roles of the workflow management unit 212, the service execution unit 213, the operation mode determination unit 101, the attribute table 214, the storage management unit 251, the storage control unit 103, and the conversion table 231 are as already described above with reference to FIGS. 1 and 2.

In the example in FIG. 3, in a processing phase in which the search reference process 372 is executed, a virtual volume 104a for managing data accessed based on the search reference process 372 may be set to be handled by the "remote mode". For example, the "remote mode" may be set at the point 371. When there is a read access or a write access to data managed in the virtual volume 104a for which the "remote mode" is set, the first method is applied. Data handled in the search reference process 372 is not newly taken into the cache volume 105.

Accessed data does not always match between the search reference process 372 and a subsequent process group. An elapsed time may be long between completion of execution of the search reference process 372 and start of execution of the subsequent process group. Under these circumstances, an effect of caching tends to be low between the search reference process 372 and the subsequent process group. Therefore, it is often appropriate to apply the "remote mode" in the search reference process 372.

In the example in FIG. 3, in a processing phase in which the pre-processing process 374 and the analysis process 376 are executed, the virtual volume 104b for managing data accessed based on the pre-processing process 374 and the analysis process 376 may be set to be handled by the "cache mode". For example, the "cache mode" may be set at the point 373, and the "cache mode" may be continued at the point 375. When there is a read access or a write access to the data managed in the virtual volume 104b for which the "cache mode" is set, the second method is applied. Data handled in the pre-processing process 374 and the analysis process 376 may be taken into the cache volume 105b. That is, when the data handled in the pre-processing process 374 and the analysis process 376 is not present in the cache volume 105b (when there is a miss hit), the data may be staged (transferred and stored) from the real volume 106b to the cache volume 105b.

Most of the data handled in the pre-processing process 374 tends to be handled also in the analysis process 376. A processing result of the analysis process 376 tends to be a target of post-processing in the post-processing process 378. Based on these circumstances, it is expected that the effect of caching is improved in the pre-processing process 374 and the analysis process 376. Therefore, it is often appropriate to apply the "cache mode" in the pre-processing process 374 and the analysis process 376.

FIG. 4 shows the staging performed in the "cache mode".

A left portion in FIG. 4 shows a case where, when the service execution unit 213 issues an access request 409 to the data managed in the virtual volume 104, the data is absent in the cache volume 105 (miss hit). (When the "remote mode" is set in the virtual volume 104, a read access or a write access directly to the real volume 106 for the target data of the access request 409 is executed.)

A central portion in FIG. 4 shows a state in which, in response to the fact that (the "cache mode" is set in the virtual volume 104 and) the target data of the access request 409 is absent in the cache volume 105, a page 401 including the target data of the access request 409 is staged from the real volume 106 to the cache volume 105. By such staging 403, a copy of the page 401 (page copy 402) is maintained in the cache volume 105.

A right portion in FIG. 4 shows a state in which a read access or a write access (404 in FIG. 4) to the cache volume 105 for the target data of the access request 409 is executed after the staging 403. If the target data of the read access or the write access is present in the cache volume 105, it is possible to quickly execute a data access (as compared with the case of directly accessing the real volume 106).

In the example in FIG. 3, in a processing phase in which the post-processing process 378 is executed, a virtual volume 104c (which may be the same as the virtual volume 104b) corresponding to the post-processing process 378 may be set to be handled by the "purge mode". For example, the "purge mode" may be set at the point 377. When the "purge mode" is set, a series of processing related to the purge mode is executed at the beginning of the post-processing process 378 to which the "purge mode" is applied. After data present in a cache volume 105c is destaged to a real volume 106c (data write-back processing is executed), the data present in the cache volume 105c is erased. Further, the virtual volume 104c or the cache volume 105c may be blocked.

After the processing phase in which the post-processing process 378 is executed, an analysis result by the analysis process 376 (for example, a trained learning model (trained model parameter)) may be used exclusively by the other system 190 (on-premise environment or private cloud) and may be unnecessary for the system 100. In such a case, if the above-described purge mode control is performed, a possibility that data unnecessarily stored in the cache volume 105c continues to remain in the cache volume 105 is low (or the possibility is eliminated), and it is expected that a data management cost (data distribution cost) is reduced. If it is possible to reduce the data management cost (data distribution cost), it is also possible to reduce consumption of resources and electric energy in the system 100 or the like.

FIG. 5 shows the destaging performed in the "purge mode".

A left portion in FIG. 5 shows a case where, before the destaging is performed and when the service execution unit 213 issues an access request to the data managed in the virtual volume 104, the data is present in the cache volume 105 (hit). If there is a hit in the cache volume 105 for the page copy 402 including the target data of the access request before the destaging is performed, the read access or the write access (404 in FIG. 5) to the cache volume 105 for the data is executed.

A central portion in FIG. 5 shows a state in which the page copy 402 present in the cache volume 105 is destaged from the cache volume 105 to the real volume 106 along with setting of the "purge mode" for the virtual volume 104. Among data present in the cache volume 105, at least (data that needs to be stored among) data that is not yet reflected in the real volume 106 (dirty data) is transferred from the cache volume 105 to the real volume 106, and the dirty data is maintained in the real volume 106. An operation of transferring the data and maintaining the data in the real volume 106 in such destaging 503 may be performed only for the dirty data, may be performed for the page copy 402 including the dirty data, or may be performed for all valid page copies 402 present in the cache volume 105. In order to reduce a risk that the dirty data is lost before the destaging 503 is performed, the cache volume 105 may be made redundant (for example, through RAID).

After the destaging 503 is completed in the central portion in FIG. 5, the page copies 402 present in the cache volume 105 may all be erased. In the system 100, the virtual volume 104 or the cache volume 105 subjected to the destaging 503 may be handled to be blocked.

A right portion in FIG. 5 shows a state in which the service execution unit 213 accesses the data managed in the virtual volume 104 subjected to the destaging again after the destaging 503 and after the page copies 402 present in the cache volume 105 are all erased (in many cases, related to a separate workflow). At this time point, since the data managed in the virtual volume 104 is present only in the real volume 106, a read access or a write access (504 in FIG. 5) directly to the real volume 106 for the target data of the access request is executed (if the "remote mode" is applied to the virtual volume 104).

As shown in FIG. 3, by setting the operation mode 108 for each processing phase, it is possible to implement a state in which the virtual volume 104 is accessed in the "cache mode" only when the pre-processing process 374 and the analysis process 376 are executed, and the data handled in the processing indicated by the workflow 307 is not retained in the system 100 (public cloud) after the analysis process 376 is completed. Only when the pre-processing process 374 and the analysis process 376 are executed, (a copy of) data in the other system 190 (on-premise environment or private cloud) is placed in the system 100 (public cloud), and thus it can be expected that the data management cost (data distribution costs) is reduced, a capacity (size) of data managed in the cache volume 105 used in the system 100 (public cloud) is reduced, or a data transfer volume between the system 100 and the other system 190 is reduced. When it is possible to implement the various types of reduction as described above, it is also possible to reduce consumption of resources and electric energy in the system 100 or the like.

2.2. Second Example of Processing Phase and Operation Mode (FIG. 6)

Figure 6:
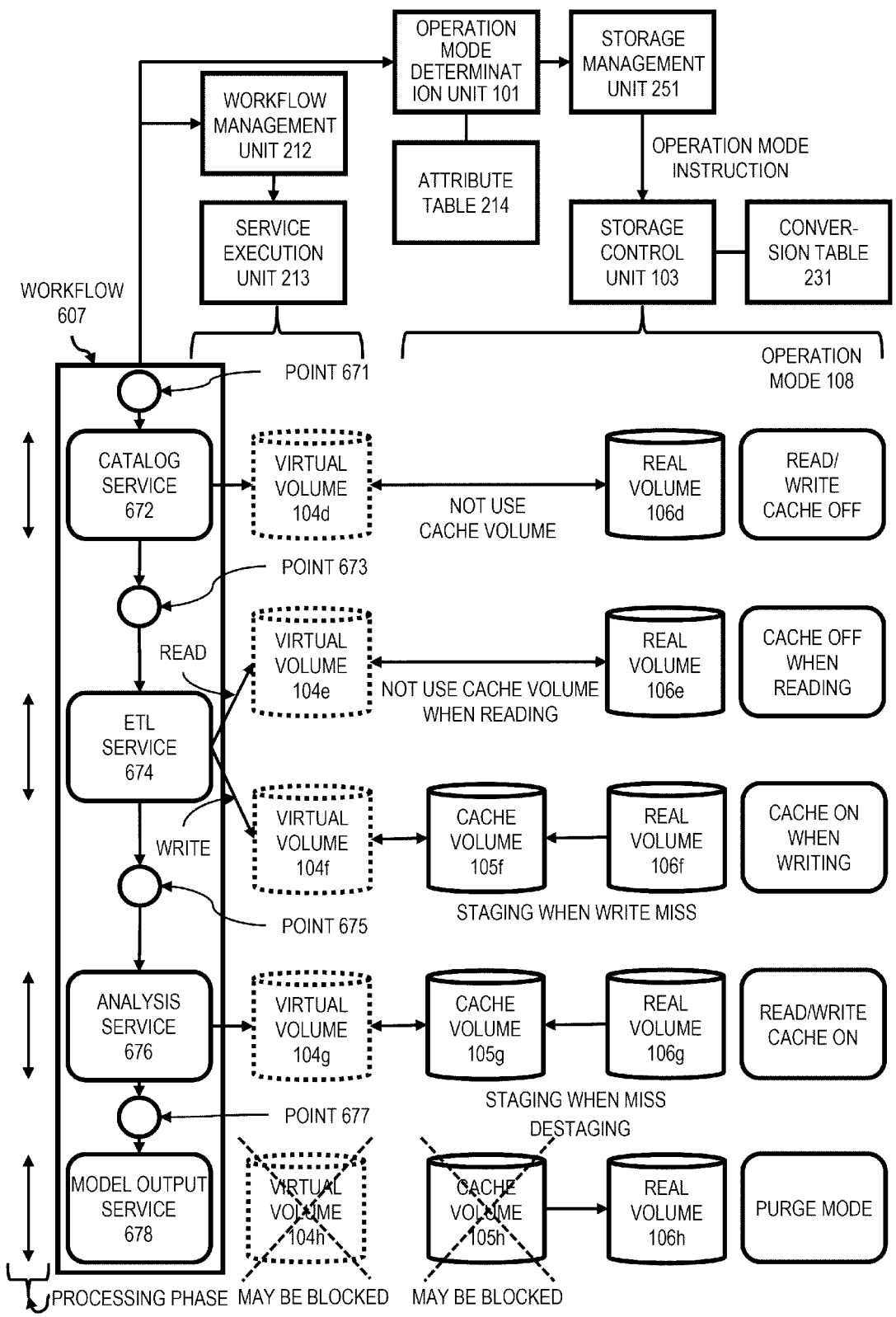
FIG. 6 shows a second example of the processing phase and the operation mode.

FIG. 6 shows a second example of the workflow indicating the processing 107, the processing phase in the processing 107, and the operation mode corresponding to the phase, which can be handled in the embodiment of the disclosure. As shown in FIG. 6, for the processing phase (service) or the virtual volume 104 associated with the processing phase (service), the operation mode 108 may be set, which is the "OFF mode" for the read access, the "ON mode" for the read access, the "OFF mode" for the write access, the "ON mode" for the write access, or the "purge mode".

In the example in FIG. 6, a workflow 607 (data analysis workflow) indicating processing 107 indicates a catalog service 672, an ETL service 674, an analysis service 676, and a model output service 678 in an order of execution. Each service corresponds to each processing phase. The workflow 607 may include points 671, 673, 675, and 677 between these services. Each of the points may indicate a control content of transition (start or end of the service (phase)) between services (between phases) and a control content of repetition of the service (phase).

The catalog service 672 may be a type of a service for searching for and referring to target data to be analyzed. The catalog service 672 may search for meta information accumulated in a catalog volume, for example. Here, the meta information is used to search for the target data to be analyzed.

The ETL service 674 may be a type of a service that executes pre-processing (for example, data reshaping) on the target data to be analyzed. The ETL service 674 performs at least one of extraction, transformation, and loading on the target data to be analyzed.

The analysis service 676 may be a type of service that performs data analysis using the target data to be analyzed that is reshaped by the ETL service 674. The analysis service 676 may be, for example, a process of training a learning model (for example, training a model parameter) by executing machine learning using the target data to be analyzed.

The model output service 678 may be a service that outputs an analysis result obtained by the analysis service 676 from the system 100 (public cloud) to the other system 190 (on-premise environment or private cloud). The model output service 678 may be, for example, a process in which information (for example, a trained model parameter) related to the learning model trained by the analysis service 676 is transmitted from the system 100 (public cloud) to the other system 190 (on-premise environment or private cloud), and the information is stored in the other system 190 (on-premise environment or private cloud).

The workflow management unit 212 refers to the workflow information 207 (workflow 607) in which each of the processes (phases) having the contents described above is described as each of workflow entities.

The workflow information 207 (workflow 607) may be directly referred to by the operation mode determination unit 101. In this case, it can be said that the operation mode determination unit 101 analyzes the workflow 607. Alternatively, the operation mode determination unit 101 may be provided with information (workflow entity) in the workflow information 207 (workflow 607) from the workflow management unit 212. In this case, the operation mode determination unit 101 determines the operation mode 108 for the processing phase corresponding to each workflow entity individually provided by the workflow management unit 212.

Roles of the workflow management unit 212, the service execution unit 213, the operation mode determination unit 101, the attribute table 214, the storage management unit 251, the storage control unit 103, and the conversion table 231 are as already described above with reference to FIGS. 1 and 2.

In the example in FIG. 6, in a processing phase in which the catalog service 672 is executed, a virtual volume 104d for managing data accessed based on the catalog service 672 may be set to be handled by the "OFF mode" for both the read access and the write access. For example, at the point 671, the "OFF mode" may be set for both the read access and the write access. When there is a read access or a write access to data managed in the virtual volume 104d for which the "OFF mode" is set for both the read access and the write access, the first method is applied. Data handled in the catalog service 672 is not newly taken into the cache volume 105.

A technical reason and a background for setting the "OFF mode" for both the read access and the write access in the catalog service 672 may be the same as a technical reason and a background for setting the "remote mode" in the search reference process 372 in FIG. 3.

In the example in FIG. 6, in a processing phase in which the ETL service 674 is executed, a virtual volume 104e for managing data read-accessed based on the ETL service 674 may be set to be handled by the "OFF mode" whereas a virtual volume 104f for managing data write-accessed based on the ETL service 674 may be set to be handled by the "ON mode". Alternatively, in a case where the read access and the write access based on the ETL service 674 are executed on the same virtual volume 104, when the read access to the virtual volume 104 based on the ETL service 674 is executed, handling by the "OFF mode" may be set, and when the write access to the virtual volume 104 based on the ETL service 674 is executed, handling by the "ON mode" may be set. For example, at the point 673, the "OFF mode" for the read access and the "ON mode" for the write access may be set. At the time of the read access in the "OFF mode", the first method is applied. At the time of the write access in the "ON mode", the second method is applied. A page including data written based on the ETL service 674 may be newly taken into a cache volume 105f.

In the ETL service 674, the target data to be analyzed (before reshaping) is read, data reshaping is performed, and the target data to be analyzed after reshaping is obtained. The reshaped target data to be analyzed tends to be used in the analysis service 676 whereas the target data to be analyzed before reshaping tends not to be used in the analysis service 676. Under such circumstances, it is expected that data written based on the ETL service 674 has a high cache effect whereas data read based on the ETL service 674 has a low cache effect. Therefore, it is often appropriate to apply the "ON mode" to the write access and apply the "OFF mode" to the read access.

In the example in FIG. 6, in a processing phase in which the analysis service 676 is executed, a virtual volume 104g for managing data accessed based on the analysis service 676 may be set to be handled by the "ON mode" for both the read access and the write access. For example, at the point 675, the "ON mode" may be set for both the read access and the write access. When there is read access or a write access to data managed in the virtual volume 104g for which the "ON mode" is set for both the read access and the write access, the second method is applied.

A technical reason and a background for setting the "ON mode" for both the read access and the write access in the analysis service 676 may be the same as a technical reason and a background for setting the "cache mode" in the analysis process 376 in FIG. 3.

In the example in FIG. 6, in a processing phase in which the model output service 678 is executed, a virtual volume 104h (which may be the same as the virtual volume 104g) corresponding to the model output service 678 may be set to be handled by the "purge mode". For example, the "purge mode" may be set at the point 677. When the "purge mode" is set, a series of processing related to the purge mode described above is executed at the beginning of the model output service 678 to which the "purge mode" is applied. That is, after data present in a cache volume 105h is destaged to a real volume 106h (data write-back processing is executed), the data present in the cache volume 105h is erased. Further, the virtual volume 104h or the cache volume 105h may be blocked.

A technical reason and a background of the "purge mode" in the model output service 678 may be the same as a technical reason and a background of the "purge mode" in the post-processing process 378 in FIG. 3.

3. Overall Configuration of Embodiment of Disclosure (FIG. 7)

Figure 7:
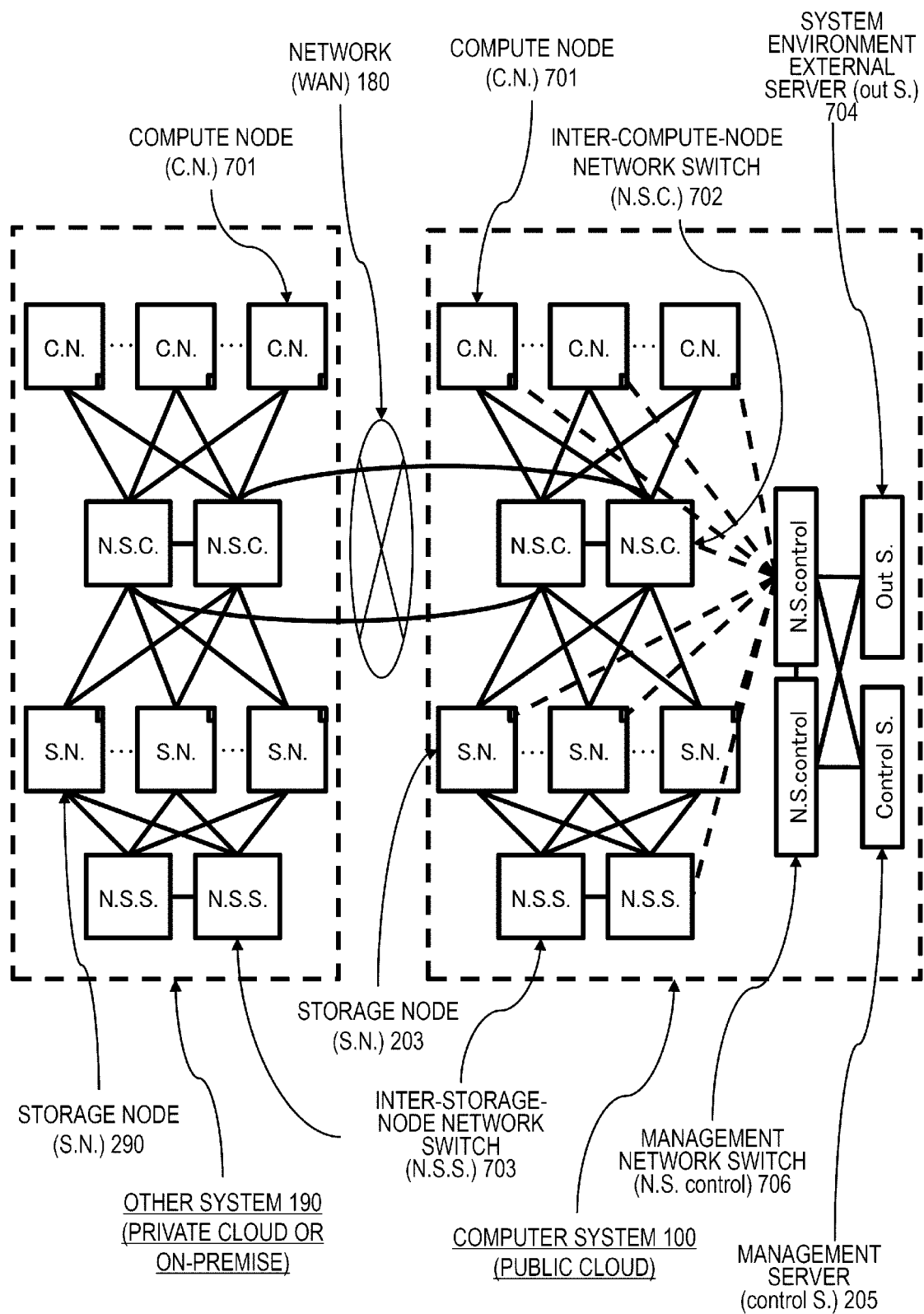
FIG. 7 shows an overall configuration in terms of hardware of the embodiment of the disclosure.

FIG. 7 shows an overall configuration in terms of hardware of the embodiment of the disclosure. (As will be described later in modification (3), a part or all of servers, nodes, switches, and the like shown in FIG. 7 may be virtually implemented.)

In FIG. 7, the system 100 (public cloud) and the other system 190 (on-premise environment or private cloud) are interconnected via the network 180 (for example, WAN). In the overall configuration shown in FIG. 7, it may be said that a hybrid cloud environment is constructed. For example, an inter-compute-node network switch 702 (N.S.C.) in the system 100 (public cloud) and an inter-compute-node network switch 702 (N.S.C.) in the other system 190 (on-premise environment or private cloud) may be interconnected via the network 180 (for example, WAN).

Each of the system 100 (public cloud) and the other system 190 (on-premise environment or private cloud) may include one or a plurality of compute nodes 701, one or a plurality of inter-compute-node network switches 702 (N.S.C.), one or a plurality of storage nodes 203 or 290 (S.N.), and one or a plurality of inter-storage-node network switches 703 (N.S.S.).

The compute node 701 (C.N.) in the system 100 (public cloud) may play a role of the application server 201 (roles of the operation mode determination unit 101, the workflow management unit 212, and the service execution unit 213). When the compute node 701 (C.N.) as the application server 201 executes various programs, an access request to data maintained by the storage node 203 or 290 (S.N.) can be issued.

A storage cluster may be formed by a plurality of storage nodes 203 (S.N.) in the system 100 (public cloud). Similarly, a storage cluster may be formed by a plurality of storage nodes 290 (S.N.) in the other system 190 (on-premise environment or private cloud). In the hybrid cloud environment, these storage clusters may be connected by the network 180 (for example, WAN).

The inter-compute-node network switch 702 (N.S.C.) in the system 100 (public cloud) mediates communication between the compute nodes 701 (C.N.) and communication between the compute node 701 (C.N.) and the storage node 203 (S.N.). The inter-compute-node network switch 702 (N.S.C.) in the system 190 (on-premise environment or private cloud) mediates communication between the compute nodes 701 (C.N.) and communication between the compute node 701 (C.N.) and the storage node 290 (S.N.).

The inter-storage-node network switch 703 (N.S.S.) in the system 100 (public cloud) mediates communication between the storage nodes 203 (S.N.). The inter-storage-node network switch 703 (N.S.S.) in the other system 190 (on-premise environment or private cloud) mediates communication between the storage nodes 290 (S.N.).

In order to manage the system 100 (further, the other system 190), the system 100 may include the management server 205 (control S.) or a system environment external server 704 (out S.). The management server 205 (control S.) or the system environment external server 704 (out S.) may communicate with a part or all of the compute node 701, the inter-compute-node network switch 702 (N.S.C.), the storage node 203 (S.N.), and the inter-storage-node network switch 703 (N.S.S.) of the system 100 via a management network switch 706 (N.S. control) or a management network. When the compute node 701 or the storage node 203 (S.N.) intercommunicates with the management server 205 (control S.) or the system environment external server 704 (out S.) via the management network switch 706 (N.S. control), communication may be performed via a management port 825 (MNP) of the compute node 701 or the storage node 203 (S.N.) (shown in FIG. 8 to be described later).

In order to ensure availability of the system 100 (public cloud) or the other system 190 (on-premise environment or private cloud), a part or all of servers, nodes, switches, and paths may be made redundant. However, in FIG. 7, for ease of viewing, a part of a redundant configuration (for example, a part of the management network) is omitted.

A terminal of a user of a cloud or the like may intercommunicate with the system 100 or the other system 190 via a network (WAN).

4. Computer Architecture

A computer architecture for implementing each of the application server 201 (compute node 701), the storage node 203 or 290, and the management server 205 in the embodiment of the disclosure may be any computer architecture within a range in which requirements of an implemented functional unit or storage (volume) are satisfied. Hereinafter, first, an example of a computer architecture for a storage node is shown, and thereafter, a computer architecture for various servers and nodes is shown.

4.1. Architecture for Storage Node (FIG. 8)

Figure 8:
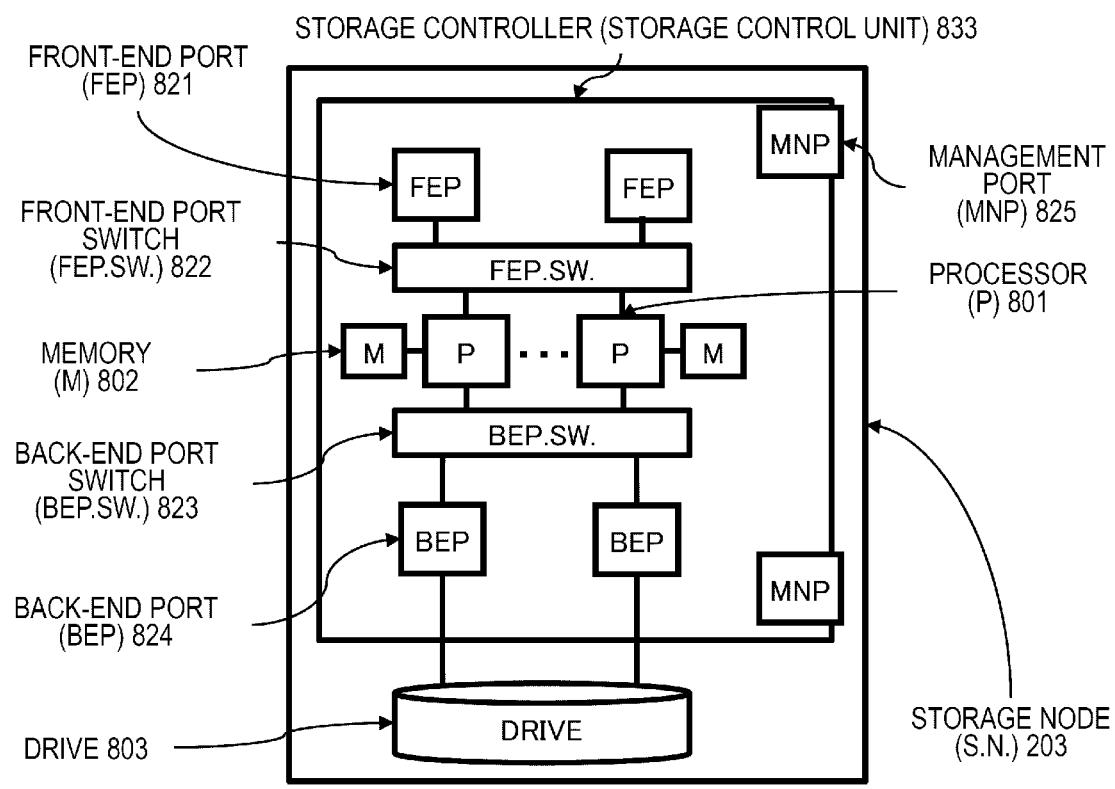
FIG. 8 shows an example of a computer architecture for implementing a storage node.

FIG. 8 shows an example of a computer architecture for implementing the storage node 203 (or 293).

In the example in FIG. 8, the storage node 203 includes a storage controller 833 and a drive 803 (DRIVE). The storage controller 833 corresponds to the storage control unit 103. The drive 803 (DRIVE) may maintain data managed in the cache volume 105. (In the storage node 290 in the other system 190, the drive 803 (DRIVE) may maintain data managed in the real volume 106.) The storage controller 833 and the drive 803 (DRIVE) are communicable with each other.

The storage controller 833 may include one or a plurality of processors 801 (P), one or a plurality of memories 802 (M), one or a plurality of front-end ports 821 (FEP), one or a plurality of front-end port switches 822 (FEP S.W.), one or a plurality of back-end port switches 823 (BEP S.W.), one or a plurality of back-end ports 824 (BEP), and one or a plurality of management ports 825 (MNP).

An instruction (for example, an access request) from the application server 201 (compute node 701) is transmitted to the processor 801 (P) via the front-end port 821 (FEP) and the front-end port switch 822 (FEP S.W.). By using resources such as the processor 801 (P) and the memory 802 (M) and executing the storage control program or the like, the drive 803 (DRIVE) is accessed via the back-end port switch 823 (BEP S.W.) and the back-end port 824 (BEP). The storage node 203 (S.N.) provides functions such as data input and output processing, data encryption, data compression, snap shot creation, and data virtualization according to the instruction from the application server 201 (compute node 701).

Intercommunication between the management server 205 and the storage node 203 may be performed via the management port 825 (MNP).

FIG. 8 shows the computer architecture for implementing the storage node 203, and various servers and nodes (for example, the application server 201 (compute node 701) and the management server 205) other than the storage node 203 and various functional units can be implemented by the same computer architecture as in FIG. 8.

4.2. Other Example of Architecture for Various Servers and Nodes (FIG. 9)

FIG. 9 shows another example of the computer architecture for implementing various servers, nodes, and functional units in the embodiment of the disclosure.

In order to implement the system 100 (or the other system 190, the same applies to description of FIG. 9 later), or a server, a node, or a functional unit provided in the system 100, a part or all of an information processing apparatus 901 (for example, a CPU or processor, or one or a plurality of microprocessors), a storage apparatus 902 (for example, a memory), a non-volatile recording medium or recording apparatus 903 (for example, a non-volatile memory (for example, a flash memory) or a non-volatile disk apparatus), an external recording medium drive 904 (for example, a disk drive), an input apparatus 906 (for example, a mouse, a keyboard, an imaging apparatus, a sensor, a touch panel, or a pointing device), a display or output apparatus 907 (for example, a display, a printer, or a speaker), a communication apparatus 908 (for example, a communication apparatus for wired communication or a communication apparatus for wireless communication, or may be a network interface apparatus (NIC) that controls communication with other systems, servers, nodes, or apparatuses according to a predetermined protocol), an external input and output port 909, and a reading apparatus 910 may be interconnected by an interconnection unit 911 (for example, a bus or a crossbar switch).

The non-volatile recording medium or recording apparatus 903 records one or a plurality of a program 920*a* (for example, a program for implementing a functional configuration according to the disclosure, such as an operation mode determination program, a workflow management program, a service execution program, various service programs, a storage management program, or a storage control program), various databases 921, and various types of information 922. There may be an aspect in which, instead of recording information indicated by 920*a*, 921, or 922 in the non-volatile recording medium or recording apparatus 903, the system 100 or the server, the node, or the functional unit provided in the system acquires (accesses) a part or all of the information indicated by 920*a*, 921, or 922 from the outside of FIG. 9.

The external recording medium drive 904 can be connected to an external recording medium 905 (for example, a portable recording disk (DVD or the like), an IC card, an SD card, a non-volatile memory (for example, a flash memory), or a portable hard disk). There may be an aspect in which a part or all of the information indicated by 920*a*, 921, or 922 is transferred from the external recording medium 905 to the non-volatile recording medium or recording apparatus 903 or the storage apparatus 902 and stored therein. The external recording medium 905 may be used to record a program or data handled in the system 100 or the server, the node, or the functional unit provided in the system. There may be an aspect in which the external recording medium drive 904 and the external recording medium 905 are connected to the system 100 or the server, the node, or the functional unit provided in the system 100 via a network.

A part or all of the information indicated by 920*a*, 921, or 922 may be introduced via the input apparatus 906, the communication apparatus 908, or the external input and output port 909, and recorded or stored in the non-volatile recording medium or recording apparatus 903 or the storage apparatus 902.

In order for the architecture in FIG. 9 to function as the system 100 or the server, the node, or the functional unit provided in the system 100, or a part of each unit (one or a series of steps are executed), a part or all of 920*a*, 921, or 922 (for example, the program 920*a*) may be loaded into the storage apparatus 902 (for example, from the non-volatile recording medium or recording apparatus 903). The program after loading is indicated by 920*b* in FIG. 9. The information processing apparatus 901 may execute the program 920*b* (using various information present in the non-volatile recording medium or recording apparatus 903 or the like as necessary). By executing the program 920*b*, a function of the system 100, or the server, the node, or the functional unit provided in the system 100, or a part of each unit is implemented (one or a series of steps are executed). At this time, various buffers 923 temporarily formed in the storage apparatus 902 may also be used.

5. Control and the Like Performed in Embodiment of Disclosure

Hereinafter, control and the like performed in the embodiment of the disclosure will be described generally in time series. Not all of steps described in the following description are essential. Execution of steps other than the steps described in the following description is not hindered.

5.1. Workflow Information (FIGS. 10, 11, and 12)

Figure 10:
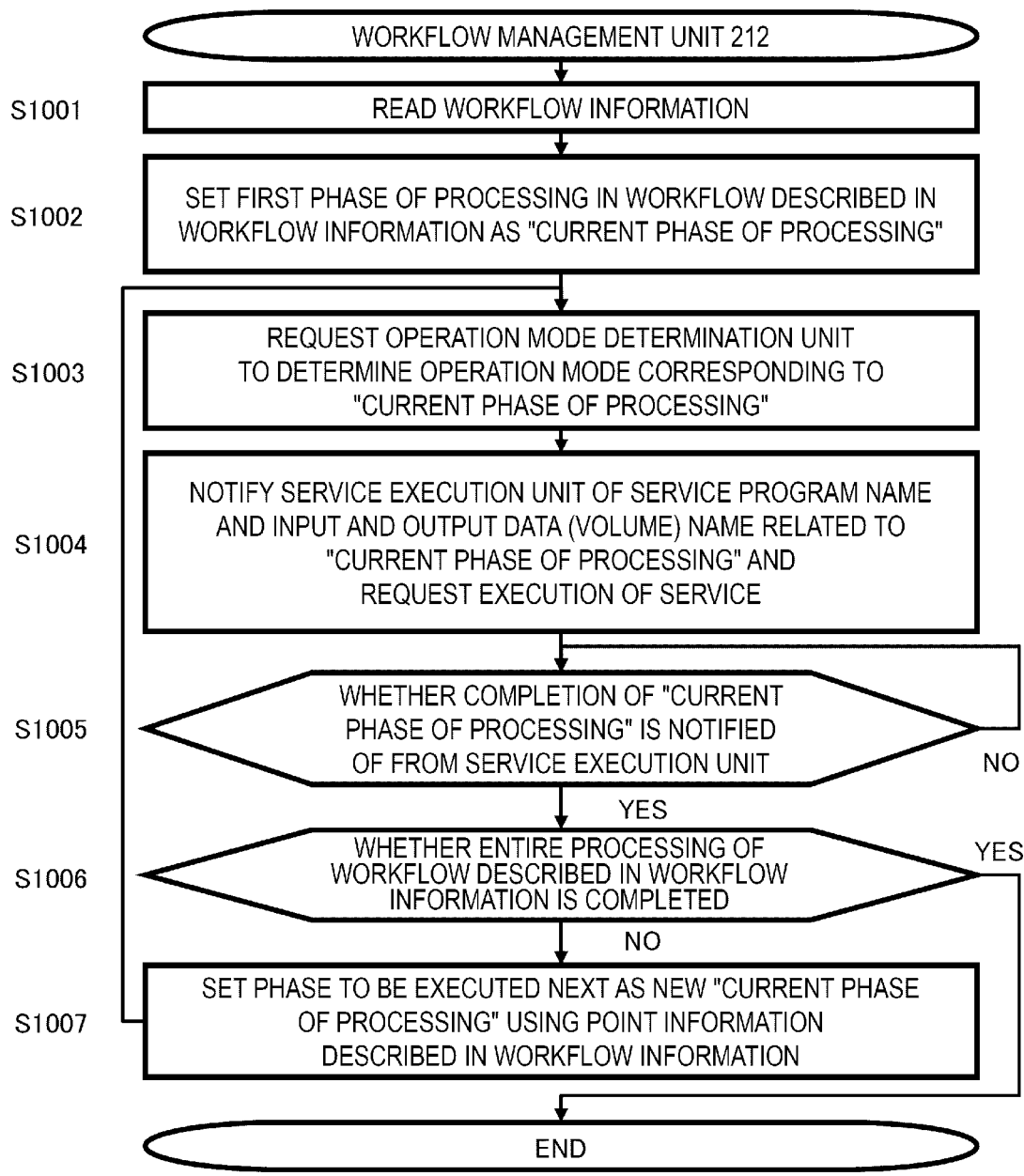
FIG. 10 shows a flowchart of a workflow management unit.

FIG. 10 shows a group of steps executed by the workflow management unit 212.

In step 1001 in FIG. 10, the workflow management unit 212 reads the workflow information 207 describing the workflow of the processing 107.

Figure 11:
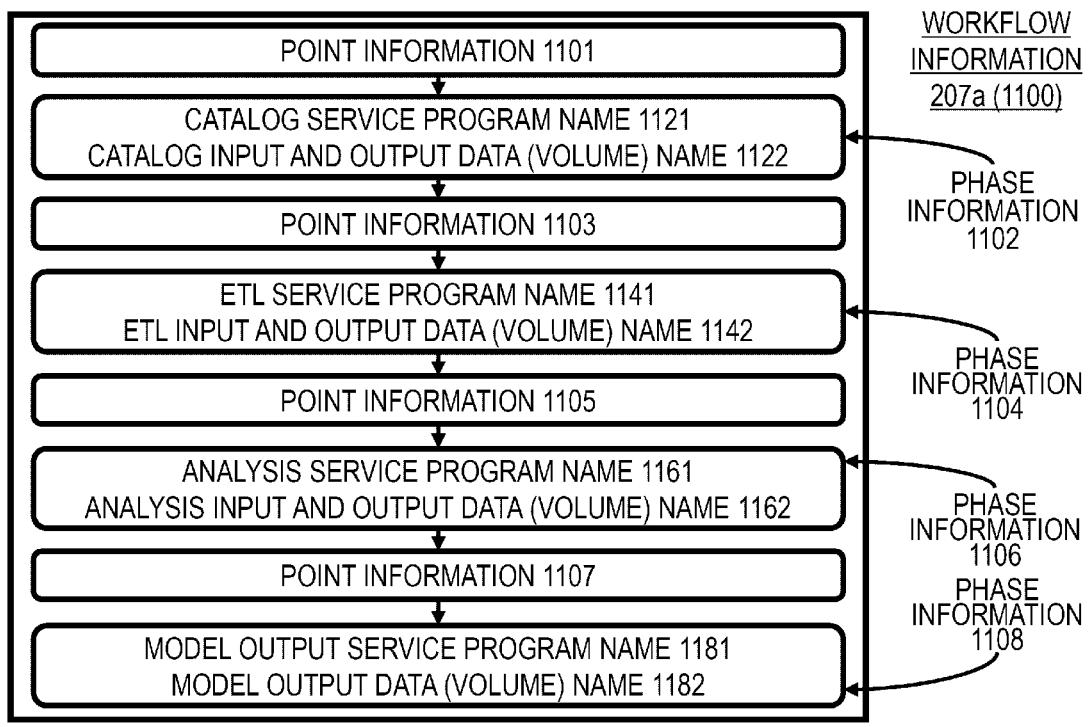
FIG. 11 shows a first example of workflow information.
Figure 12:
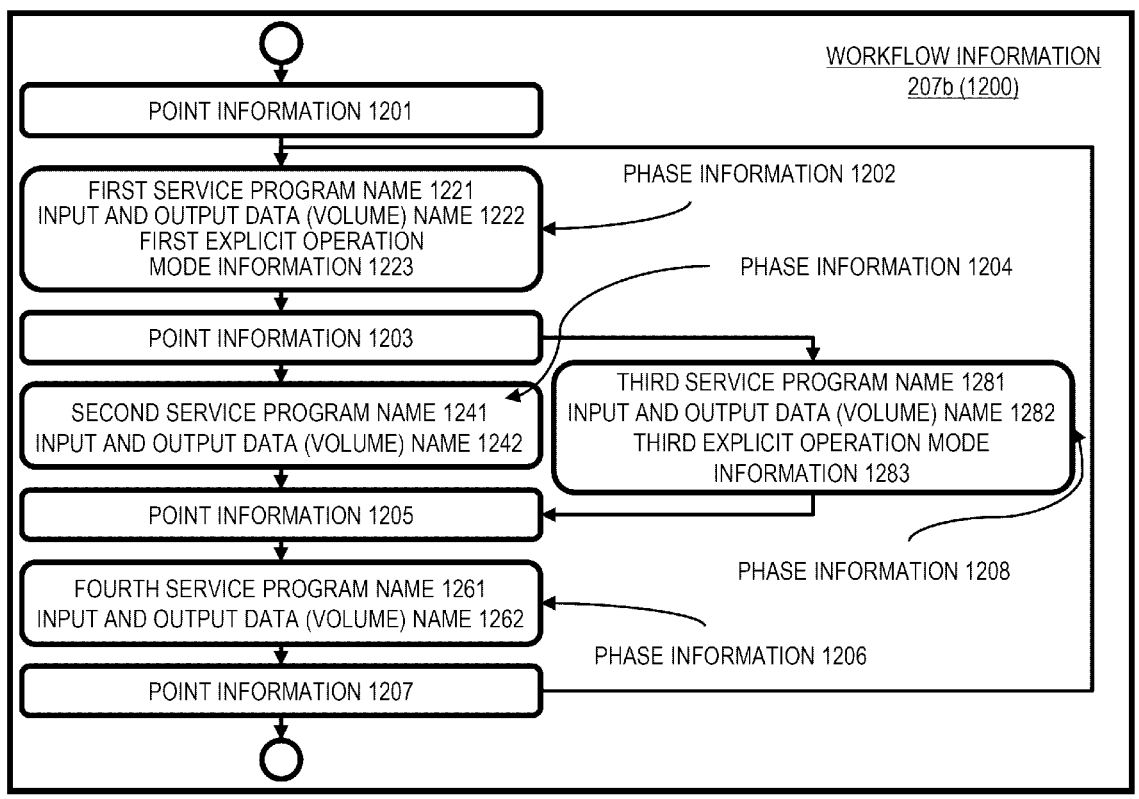
FIG. 12 shows a second example of the workflow information.

FIG. 11 shows a first example of the workflow information 207. Workflow information 207*a* (or workflow information 1100) shown in FIG. 11 corresponds to the workflow 607 shown in FIG. 6.

The workflow information 1100 may include point information 1101, 1103, 1105, and 1107 and phase information 1102, 1104, 1106, and 1108. (The point information and the phase information may each be referred to as a workflow entity.) The point information 1101, 1103, 1105, and 1107 are information describing the points 671, 673, 675, and 677 in FIG. 6, respectively. The phase information 1102, 1104, 1106, and 1108 are information describing the phase of the catalog service 672, the phase of the ETL service 674, the phase of the analysis service 676, and the phase of the model output service 678 of FIG. 6, respectively.

Each piece of point information may be information describing a control content of transition between phases (start and end of the phase) and a control content of repetition of the phase.

Each piece of phase information may include information indicating a type of a service program to be executed (service program name) or a type of input and output data (input and output data name) in a corresponding phase. The input and output data name may be a name of a volume (for example, a virtual volume) whose input and output data is managed. For example, the phase information 1102 corresponding to the phase of the catalog service 672 may include one or both of a catalog service program name 1121 and a catalog input and output data (volume) name 1122. The phase information including the above-described information is useful for determining the operation mode and requesting execution of the service.

Although not shown in FIG. 11, any one piece of the phase information may include explicit operation mode information explicitly specifying the operation mode 108 to be applied in the corresponding phase. As described above, the operation mode 108 may be an operation mode associated with the corresponding phase, or an operation mode related to handling of the virtual volume 104 (or the cache volume 105) in which data accessed in the phase is managed.

FIG. 12 shows a second example of the workflow information 207. Workflow information 207b (or workflow information 1200) shown in FIG. 12 corresponds to a workflow different from the workflow 307 shown in FIG. 3 and the workflow 607 shown in FIG. 6.

As shown in FIG. 12, the workflow information 1200 may include a split (branch) from point information 1203 to two directions of phase information 1204 and phase information 1208, a merge from the two directions of the phase information 1204 and the phase information 1208 to point information 1205, and a route for repetition from point information 1207 to phase information 1202. In this way, the workflow information 1200 may be described according to the aspect of the workflow.

Based on a content of the point information 1203, only one of a phase indicated by the phase information 1204 and a phase indicated by the phase information 1208 may be executed, or both of the two phases may be executed in parallel.

In the example in FIG. 12, the phase information 1202 and the phase information 1208 include the explicit operation mode information. In this way, in a phase corresponding to the phase information including the explicit operation mode information, an explicit operation mode indicated by the explicit operation mode information may be preferentially set as the operation mode 108 in the phase.

5.2. Operation Mode Determination (FIGS. 10, 13, 14, and 15)

Referring back to the description of FIG. 10, in step 1002 in FIG. 10, the workflow management unit 212 sets a first phase of processing in the workflow described in the workflow information 207 read in step 1001 as a "current phase of processing". For example, a phase indicated by the phase information 1102 (the phase of the catalog service 672) in the example in FIG. 11 and a phase indicated by the phase information 1202 in the example in FIG. 12 are the "first phase of processing".

In step 1003 in FIG. 10, the workflow management unit 212 requests the operation mode determination unit 101 to determine the operation mode 108 corresponding to the "current phase of processing". At the time of this request, the workflow management unit 212 may transmit, to the operation mode determination unit 101, phase information corresponding to the "current phase of processing" among the information in the workflow information 207. (Alternatively, the operation mode determination unit 101 may directly read the workflow information 207 and use phase information corresponding to the "current phase of processing".)

Figure 13:
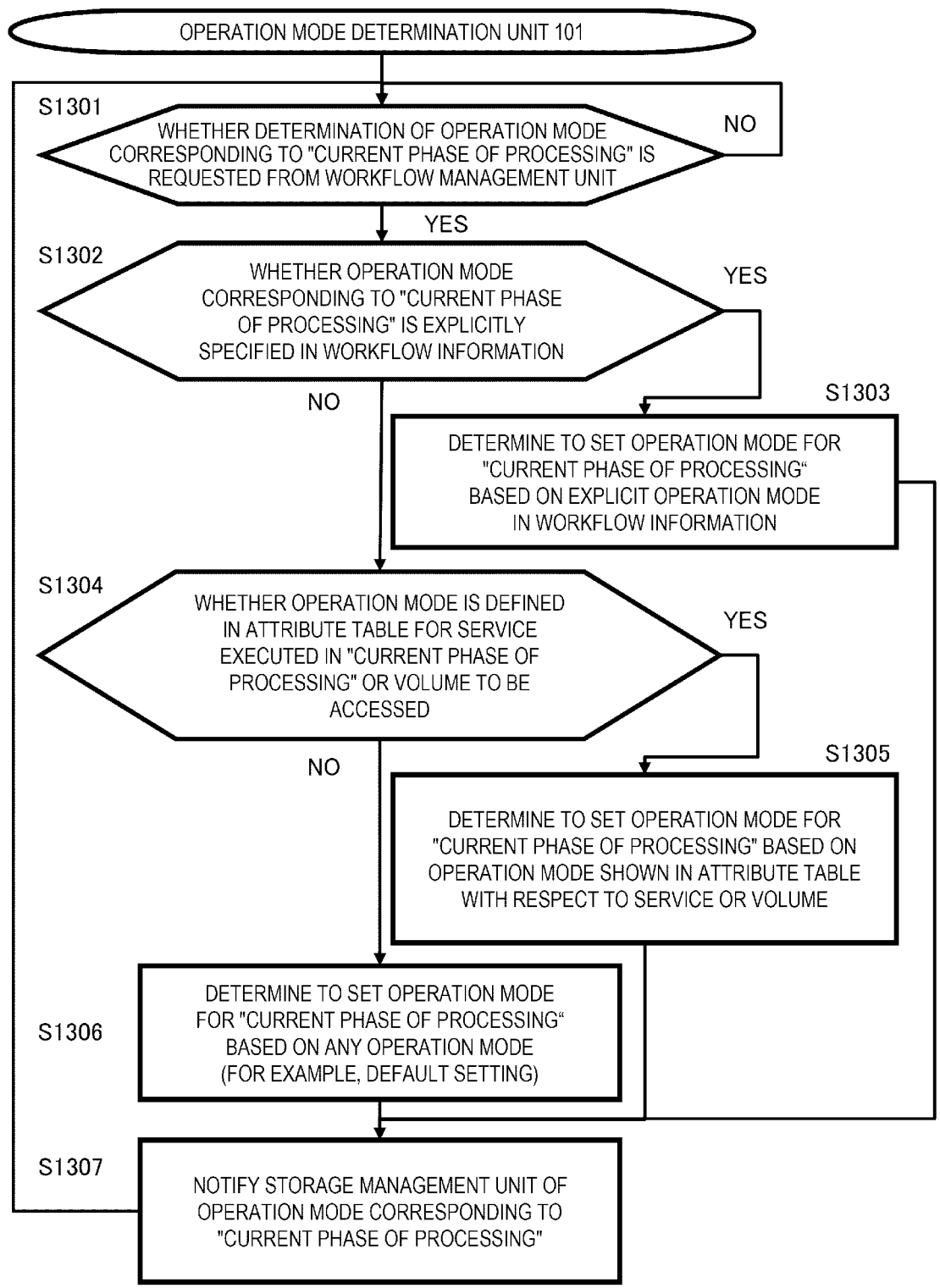
FIG. 13 shows a flowchart of an operation mode determination unit.

FIG. 13 shows a group of steps executed by the operation mode determination unit 101. Each of the steps in FIG. 13 may be regarded as one operation mode determination step.

In step 1301 in FIG. 13, the operation mode determination unit 101 determines whether the determination of the operation mode 108 corresponding to the "current phase of processing" is requested from the workflow management unit 212. While a determination result in step 1301 is negative, step 1301 may be repeated. On the other hand, when step 1003 described above is executed, the determination result in step 1301 is positive, and the control transitions to step 1302.

In step 1302 in FIG. 13, the operation mode determination unit 101 determines whether the operation mode 108 corresponding to the "current phase of processing" is explicitly specified in the workflow information 207. In the example in FIG. 11 and the example in FIG. 12, the phase information 1202 and the phase information 1208 respectively include first explicit operation mode information 1223 and third explicit operation mode information 1283, while other phase information includes no explicit operation mode information. When the phase information corresponding to the "current phase of processing" includes the explicit operation mode information, a determination result in step 1302 is positive, and the control transitions to step 1303. When the phase information corresponding to the "current phase of processing" includes no explicit operation mode information, the determination result in step 1302 is negative, and the control transitions to step 1304.

In step 1303 in FIG. 13, the operation mode determination unit 101 sets the operation mode 108 associated with the "current phase of processing" (or the operation mode 108 related to the handling of the virtual volume 104 (or the cache volume 105) in which data to be accessed in the "current phase of processing" is managed) to the operation mode indicated by the explicit operation mode information in the phase information corresponding to the "current phase of processing" in the workflow information 207. The operation mode indicated by the explicit operation mode information may be any one of the "remote mode", the "cache mode", and the "purge mode" as in the example in FIG. 3, or may be the "OFF mode" or the "ON mode" (which may be set respectively for the read access and the write access), or the "purge mode" (which may be set independently of the access) as in the example in FIG. 6. After step 1303, the control transitions to step 1307.

In step 1304 in FIG. 13, (since the operation mode is not explicitly specified for the "current phase of processing",) the operation mode determination unit 101 determines whether the operation mode 108 is defined in the attribute table 214 for a type of a service executed in the "current phase of processing" or a type of a volume (virtual volume) in which data to be accessed in the "current phase of processing" is managed.

FIG. 14 shows a first example of the attribute table 214. An attribute table 214a (or an attribute table 1400) shown in FIG. 14 may indicate a correspondence relationship among a type of a service (for example, a microservice) executed in a phase, an operation mode at the time of a read access along with execution of the service (microservice), and an operation mode at the time of a write access along with execution of the service (microservice). For example, the "OFF mode" at the time of the read access and the "ON mode" at the time of the write access are associated with the ETL service. The attribute table 214a (or the attribute table 1400) may indicate a correspondence relationship between the type of the service (for example, microservice) executed in the phase and the "purge mode". For example, the "purge mode" that is unrelated to the read access or the write access is associated with the model output service.

A "type 1 analysis service" shown in FIG. 14 may be, for example, a service for executing aggregation processing without machine learning, and a "type 2 analysis service" may be a service for training a learning model (model parameter) by machine learning.

By setting the operation mode 108 indicated in the attribute table 1400 for various services (microservices), it is possible to handle the virtual volume or the cache volume in a manner suitable for usage (context) of data in each service (microservice).

In step 1304 in FIG. 13, if the type of service (microservice) executed in the "current phase of processing" is registered in the attribute table 214*a* (or the attribute table 1400), the operation mode determination unit 101 may set the determination result in step 1304 as positive.

FIG. 15 shows a second example of the attribute table 214. An attribute table 214*b* (or an attribute table 1500) shown in FIG. 15 may indicate a correspondence relationship among a type of a volume (logical volume) or the like in which data accessed in a phase is managed, an operation mode at the time of a read access to the volume (logical volume) or the like, and an operation mode at the time of a write access to the volume (logical volume) or the like. In the attribute table 1500, the "OFF mode" at the time of both the read access and the write access is associated with a catalog volume that manages meta information for searching for target data to be analyzed. The "OFF mode" at the time of the read access and the "ON mode" at the time of the write access are associated with a virtual lake including a volume in which non-structured data among the target data to be analyzed is accumulated. The "ON mode" at the time of both the read access and the write access is associated with a virtual mart including a volume in which structured data among target data to be analyzed is accumulated. The "ON mode" at the time of both the read access and the write access is associated with a work volume that is a temporary workspace used in an analysis service. The "purge mode" regardless of the read access or the write access is associated with a model volume storing a trained learning model (model parameter).

By setting the operation mode 108 indicated in the attribute table 1500 for various volumes, or a virtual lake or a virtual mart including volumes, it is possible to handle the virtual volume and the cache volume in a manner suitable for usage (context) of data managed by each volume.

In step 1304 in FIG. 13, if the type of the volume (logical volume) or the like, in which data to be accessed in the "current phase of processing" is managed, is registered in the attribute table 214*b* (or the attribute table 1500), the operation mode determination unit 101 may set the determination result in step 1304 as positive.

If the determination result in step 1304 is positive, the control transitions to step 1305. If the determination result in step 1304 is negative, the control transitions to step 1306.

In step 1305 in FIG. 13, the operation mode determination unit 101 sets the operation mode 108 associated with the "current phase of processing" (or the operation mode 108 related to the handling of the virtual volume 104 (or the cache volume 105) in which the data accessed in the "current phase of processing" is managed) based on the attribute table 214 (for example, the attribute table 1400 in FIG. 14 or the attribute table 1500 in FIG. 15). When the type of the service executed in the "current phase of processing" is registered in the attribute table 1400 in FIG. 14 and the type of the volume (virtual volume) or the like in which the data to be accessed in the "current phase of processing" is managed is registered in the attribute table 1500 in FIG. 15, the operation mode determination unit 101 may prioritize the operation mode indicated by any one of the attribute tables, may determine the operation mode 108 based on a certain rule, or may handle as an error. After step 1305, the control transitions to step 1307.

In step 1306 in FIG. 13, (since it is not possible to determine the operation mode 108 by using the explicit operation mode information and the attribute table), the operation mode determination unit 101 may determine the operation mode 108 associated with the "current phase of processing" (or the operation mode 108 related to the handling of the virtual volume 104 (or the cache volume 105) in which the data to be accessed in the "current phase of processing" is managed) as appropriate from among operation mode candidates. For example, the operation mode determination unit 101 may set the "cache mode" based on default setting or the "ON mode" for both the read access and the write access as the operation mode 108 in the "current phase of processing".

In step 1307 in FIG. 13, the operation mode determination unit 101 notifies the storage management unit 251 in the management server 205 of the operation mode information 208 indicating the operation mode 108 determined by any one of steps 1303, 1305, and 1306. After step 1307, the control returns to step 1301.

5.3. Operation Mode Instruction (FIG. 16)

Figure 16:
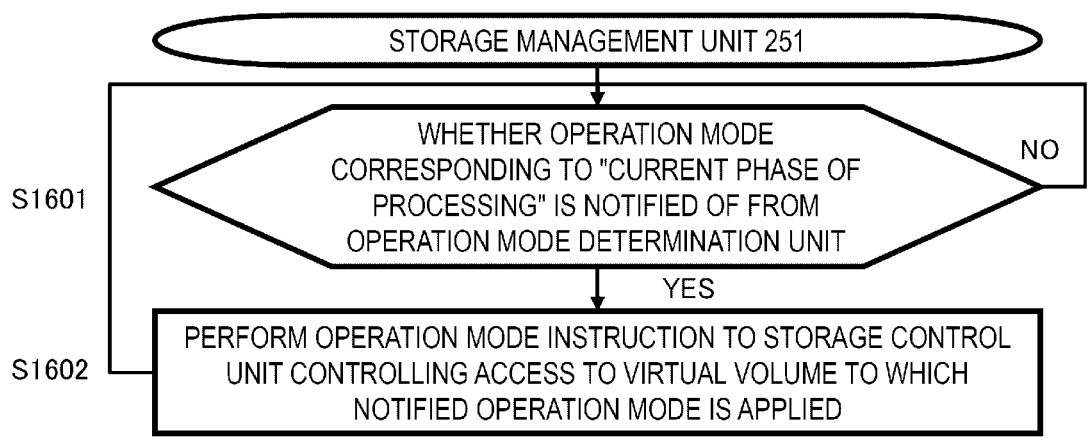
FIG. 16 shows a flowchart of a storage management unit.

FIG. 16 shows a group of steps executed by the storage management unit 251.

In step 1601 in FIG. 16, the storage management unit 251 determines whether the operation mode information 208 indicating the operation mode 108 corresponding to the "current phase of processing" is notified of from the operation mode determination unit 101. While a determination result in step 1601 is negative, step 1601 may be repeated. On the other hand, when step 1307 is executed, the determination result in step 1601 is positive, and the control transitions to step 1602.

In step 1602 in FIG. 16, the storage management unit 251 transmits the operation mode instruction 252 indicating the operation mode 108, which is to be applied, to one or a plurality of storage control units 103 that manage the virtual volume 104 (or the cache volume 105) to which the operation mode 108 indicated by the operation mode information 208 is to be applied. Here, as shown in FIG. 2, the storage management unit 251 may also transmit the operation mode instruction 252 to the other system internal storage control unit 293 that manages the real volume 106 for the virtual volume 104 to which the operation mode 108 indicated by the operation mode information 208 is to be applied in the other system internal storage control units 293 in the other system 190. (The operation mode instruction 252 may not be transmitted to the other system internal storage control unit 293 as long as control performed by the other system internal storage control unit 293 is inputting and outputting of a page for which the access request is issued from the storage control unit 103.)

As described above, the operation mode 108 for the "current phase of processing" is prepared to be applied to the virtual volume 104 (or the cache volume 105) accessed in the "current phase of processing".

5.4. Service Execution (FIGS. 10 and 17)

Returning to the description of FIG. 10, in step 1004 in FIG. 10, the workflow management unit 212 requests the service execution unit 213 to execute the "current phase of processing" (execution related to the workflow entity). At the time of this request, the workflow management unit 212 may transmit, to the service execution unit 213, phase information (for example, information such as the type of the service (microservice) executed in the "current phase of processing" or the volume (virtual volume) in which data to be accessed is managed) corresponding to the "current phase of processing" among the information in the workflow information 207. (Alternatively, the service execution unit 213 may directly read the workflow information 207 and use the phase information corresponding to the "current phase of processing".)

Figure 17:
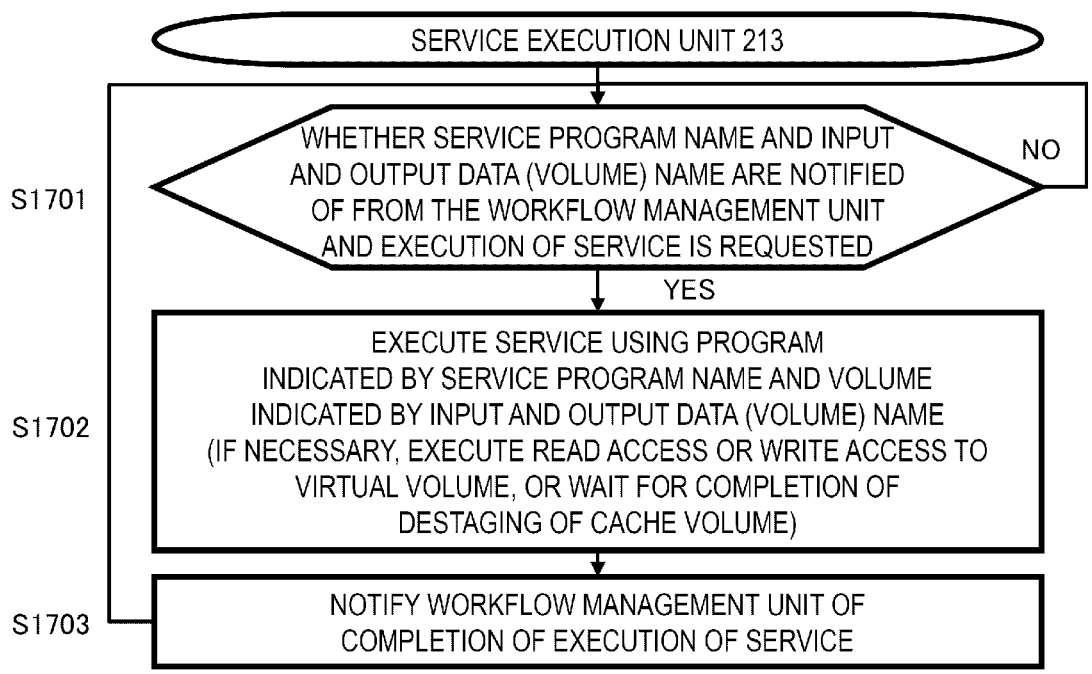
FIG. 17 shows a flowchart of a service execution unit.

FIG. 17 shows a group of steps executed by the service execution unit 213.

In step 1701 in FIG. 17, the service execution unit 213 determines whether the execution of the "current phase of processing" (execution related to the workflow entity) is requested from the workflow management unit 212. While a determination result in step 1701 is negative, step 1701 may be repeated. On the other hand, when step 1004 is executed, the determination result in step 1701 is positive, and the control transitions to step 1702.

In step 1702 (processing execution step) in FIG. 17, the service execution unit 213 executes the "current phase of processing". At this time, the service execution unit 213 may refer to, for example, the information on the type of the service (microservice) or the information on the volume (virtual volume) in which the data to be accessed is managed (which is transmitted from the workflow management unit 212 or read by the service execution unit 213). For example, the service execution unit 213 may execute a service program corresponding to a type of a specified service and may execute a read access or a write access to a specified volume (virtual volume). (Alternatively, the service execution unit 213 (service execution program) and various service programs may not be distinguished from each other, and a service program corresponding to the type of the specified service may be simply executed without the service execution program.)

Along with the execution of the "current phase of processing" (execution related to the workflow entity) in step 1702 in FIG. 17, the service execution unit 213 may execute a read access or a write access to the storage control unit 103 for the data managed in the virtual volume 104 as necessary.

In the execution of the "current phase of processing" (execution related to the workflow entity) in step 1702 in FIG. 17, in a case where the "purge mode" is set for the virtual volume 104, completion of destaging from the cache volume 105 to the real volume 106, which is performed by the storage control unit 103, may be waited for.

In step 1703 in FIG. 17, (since the execution of the "current phase of processing" is completed,) the service execution unit 213 notifies the workflow management unit 212 of the completion of the execution of (the service (microservice) executed in) the "current phase of processing". After step 1703, the control returns to step 1701.

5.4.1. Control of Read Access and Write Access (FIGS. 18, 19, and 20)

Figure 18:
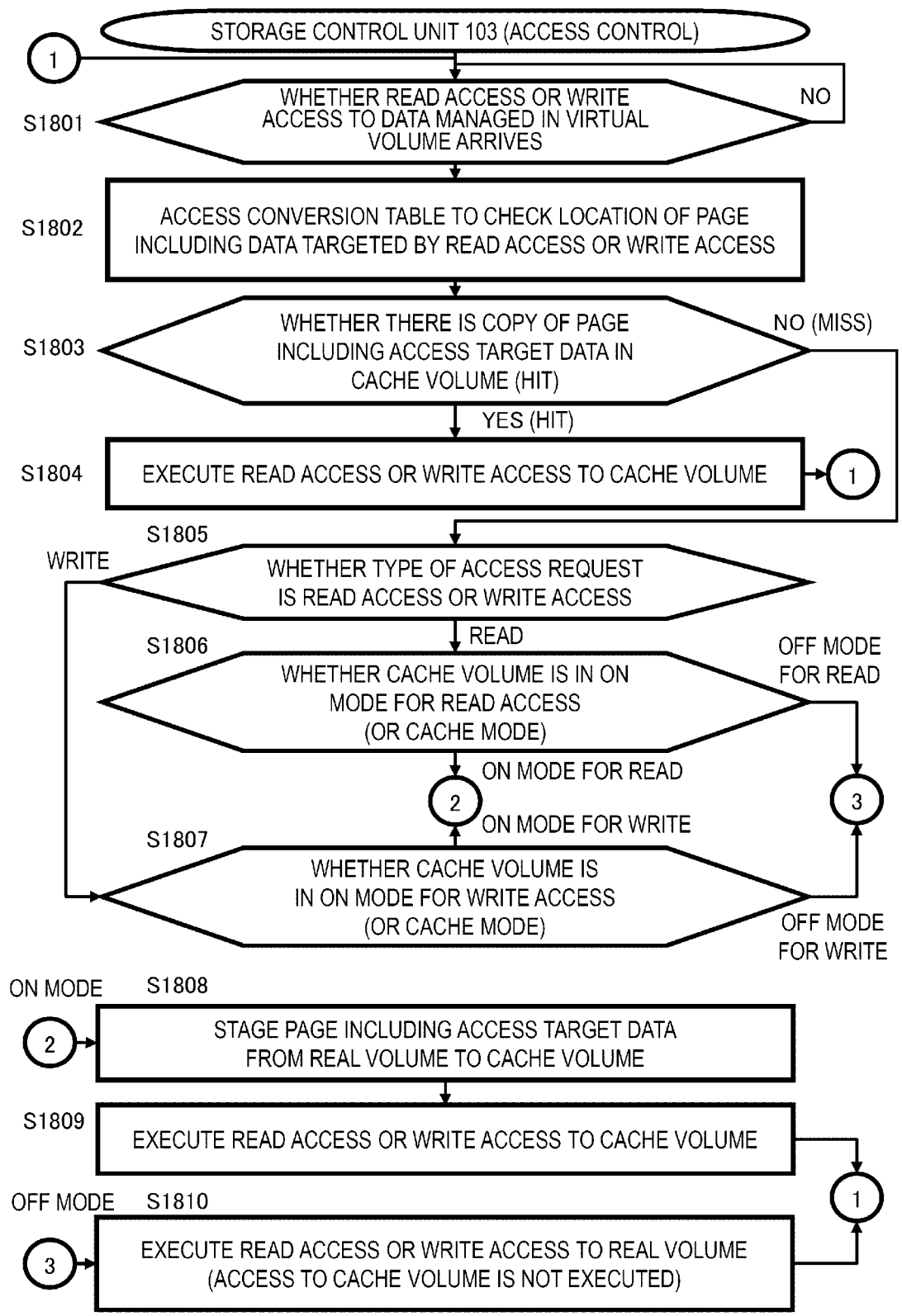
FIG. 18 shows a flowchart of access control of a storage control unit.
Figure 19:
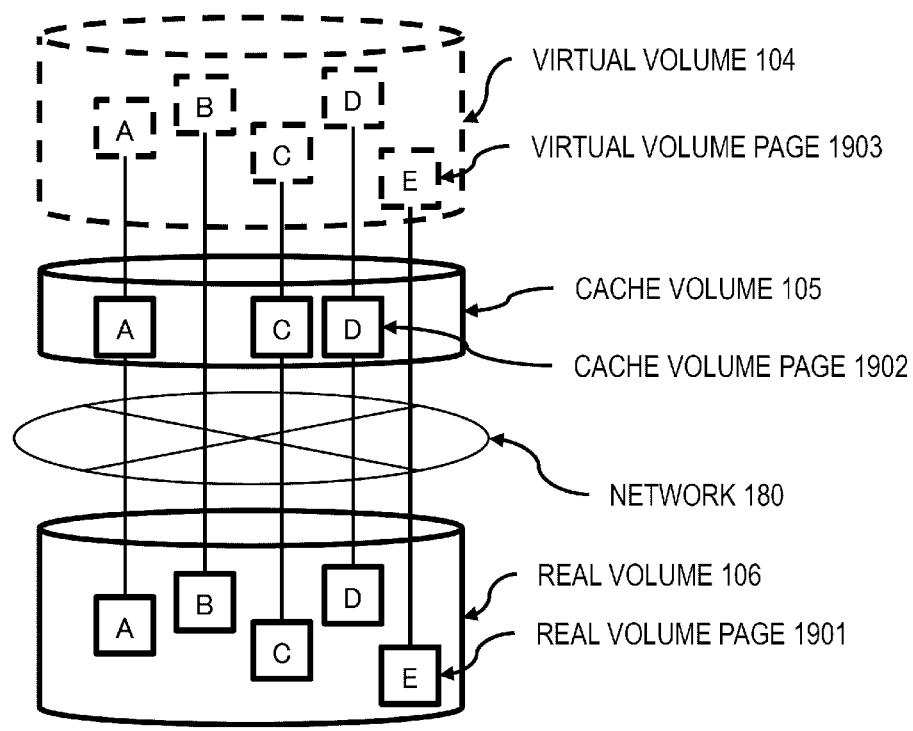
FIG. 19 shows an example of a location of a page containing data.

FIG. 18 shows a group of steps executed by the storage control unit 103 at the time of a read access or a write access. Each of the steps in FIG. 18 may be regarded as one storage control step. In circles including numbers in FIG. 18, circles having the same number are connected in transition between steps in the flowchart.

In step 1801 in FIG. 18, the storage control unit 103 determines whether a read access or a write access to the data managed in the virtual volume 104 arrives from the service execution unit 213 along with the execution of the "current phase of processing" (execution related to the workflow entity). While a determination result in step 1801 is negative, step 1801 may be repeated. On the other hand, when the read access or the write access is executed in step 1702, the determination result in step 1801 is positive, and the control transitions to step 1802.

In step 1802 in FIG. 18, the storage control unit 103 checks a location of target data of the read access or the write access arrived from the service execution unit 213. At this time, the storage control unit 103 refers to the conversion table 231.

FIG. 19 shows an example of a location of a page including the target data of the read access or the write access. FIG. 20 shows the conversion table 231 (or a conversion table 2000) corresponding to the example in FIG. 19.

In the example in FIG. 19, the virtual volume 104 includes at least five pages of "V-A", "V-B", "V-C", "V-D", and "V-E" as virtual volume pages 1903 that are virtual pages. The real volume 106 includes at least five pages of "R-A", "R-B", "R-C", "R-D", and "R-E" as real volume pages 1901 that are real pages. Here, "V-A" corresponds to "R-A", "V-B" corresponds to "R-B", "V-C" corresponds to "R-C", "V-D" corresponds to "R-D", and "V-E" corresponds to "R-E". In the example in FIG. 19, for "V-A", "V-C", and "V-D" among the virtual volume pages 1903, "C-A", "C-C", and "C-D", which are corresponding cache volume pages 1902 (page copies), are present in the cache volume 105. On the other hand, in the example in FIG. 19, for "V-B" and "V-E" among the virtual volume pages 1903, there is no corresponding cache volume page 1902 (page copy) in the cache volume 105.

A size of each page to be handled as described above may be appropriately determined. By adjusting the size of the page, a balance between access responsiveness and throughput is adjusted.

The conversion table 2000 corresponding to the example in FIG. 19 may be that shown in FIG. 20. The conversion table 2000 shown in FIG. 20 indicates association between the virtual volume pages 1903 and the real volume pages 1901. Further, if there is a cache volume page 1902 for the virtual volume page 1903, the conversion table 2000 also indicates association between the virtual volume page 1903 and the cache volume page 1902.

In step 1802 in FIG. 18, the storage control unit 103 confirms that the virtual volume page 1903 including the target data of the read access or the write access is registered in the conversion table 2000. Then, the storage control unit 103 checks whether the cache volume page 1902 is associated with the virtual volume page 1903 that is the access target in the conversion table 2000. In the examples in FIGS. 19 and 20, if the virtual volume page 1903 including the access target data is "V-C", the cache volume page 1902 is present as "C-C". On the other hand, if the virtual volume page 1903 including the access target data is "V-E", there is no corresponding cache volume page 1902, and the real page is "R-E" that is the real volume page 1901.

In step 1803 in FIG. 18, the storage control unit 103 determines whether there is a cache volume page 1902 corresponding to the virtual volume page 1903 including the target data of the read access or the write access in the cache volume 105 (cache hit or cache miss hit). In other words, the storage control unit 103 determines whether there is a page copy (cache volume page 1902) of the real volume page 1901 including the target data of the read access or the write access in the cache volume 105. If a determination result in step 1803 is positive (cache hit), the control transitions to step 1804. If the determination result in step 1803 is negative (cache miss hit), the control transitions to step 1805.

In step 1804 in FIG. 18, (since there is a cache hit,) the storage control unit 103 executes the read access or the write access to the cache volume page 1902 where the cache hit occurs in the cache volume 105. After step 1804, the control returns to step 1801.

In step 1805 in FIG. 18, (upon receiving the determination of the cache miss hit,) the storage control unit 103 determines whether a type of the access request determined as the cache miss hit is the read access or the write access. If the cache miss hit is the read access, the control transitions to step 1806. If the cache miss hit is the write access, the control transitions to step 1807.

In step 1806 in FIG. 18, (upon receiving the determination of the cache miss hit for the read access,) the storage control unit 103 checks the type of the operation mode 108 for the "current phase of processing" or the read access related to the virtual volume 104 accessed by the "current phase of processing". The operation mode 108 may be the operation mode indicated by the operation mode instruction 252 transmitted from the storage management unit 251 to the storage control unit 103 in step 1602. When the operation mode 108 is the "cache mode" described in FIG. 3 or the "ON mode" for the read access described in FIG. 6, the control transitions to step 1808. When the operation mode 108 is the "remote mode" described in FIG. 3 or the "OFF mode" for the read access described in FIG. 6, the control transitions to step 1810.

In step 1807 in FIG. 18, (upon receiving the determination of the cache miss hit for the write access,) the storage control unit 103 checks the type of the operation mode 108 for the "current phase of processing" or the write access related to the virtual volume 104 accessed by the "current phase of processing". When the operation mode 108 is the "cache mode" described in FIG. 3 or the "ON mode" for the write access described in FIG. 6, the control transitions to step 1808. When the operation mode 108 is the "remote mode" described in FIG. 3 or the "OFF mode" for the write access described in FIG. 6, the control transitions to step 1810.

In step 1808 in FIG. 18, (in an operation mode in which a page including the miss-hit data is cached,) the storage control unit 103 stages, from the real volume 106 to the cache volume 105, the real volume page 1901 including the target data of the read access or the write access. A staged page copy is the cache volume page 1902. A state of the staging is as already shown in the central portion in FIG. 4. (In order to respond to a write miss hit, a so-called write allocating method is used. There are many variations of responses to the write miss hit. Such variations may be applied to the disclosure.)

In step 1809 in FIG. 18, (upon receiving completion of the staging,) the storage control unit 103 executes the read access or the write access to the staged cache volume page 1902. A state of the read access or the write access after the staging is as already shown in the right portion in FIG. 4. After step 1809, the control returns to step 1801.

In step 1810 in FIG. 18, (in an operation mode in which the page including the miss-hit data is not cached,) the storage control unit 103 executes the read access or the write access to the real volume page 1901 including the target data of the read access or the write access. At this time, the staging from the real volume 106 to the cache volume 105 is not performed. After step 1809, the control returns to step 1801.

5.4.2. Control of Purge Mode (FIG. 21)

Figure 21:
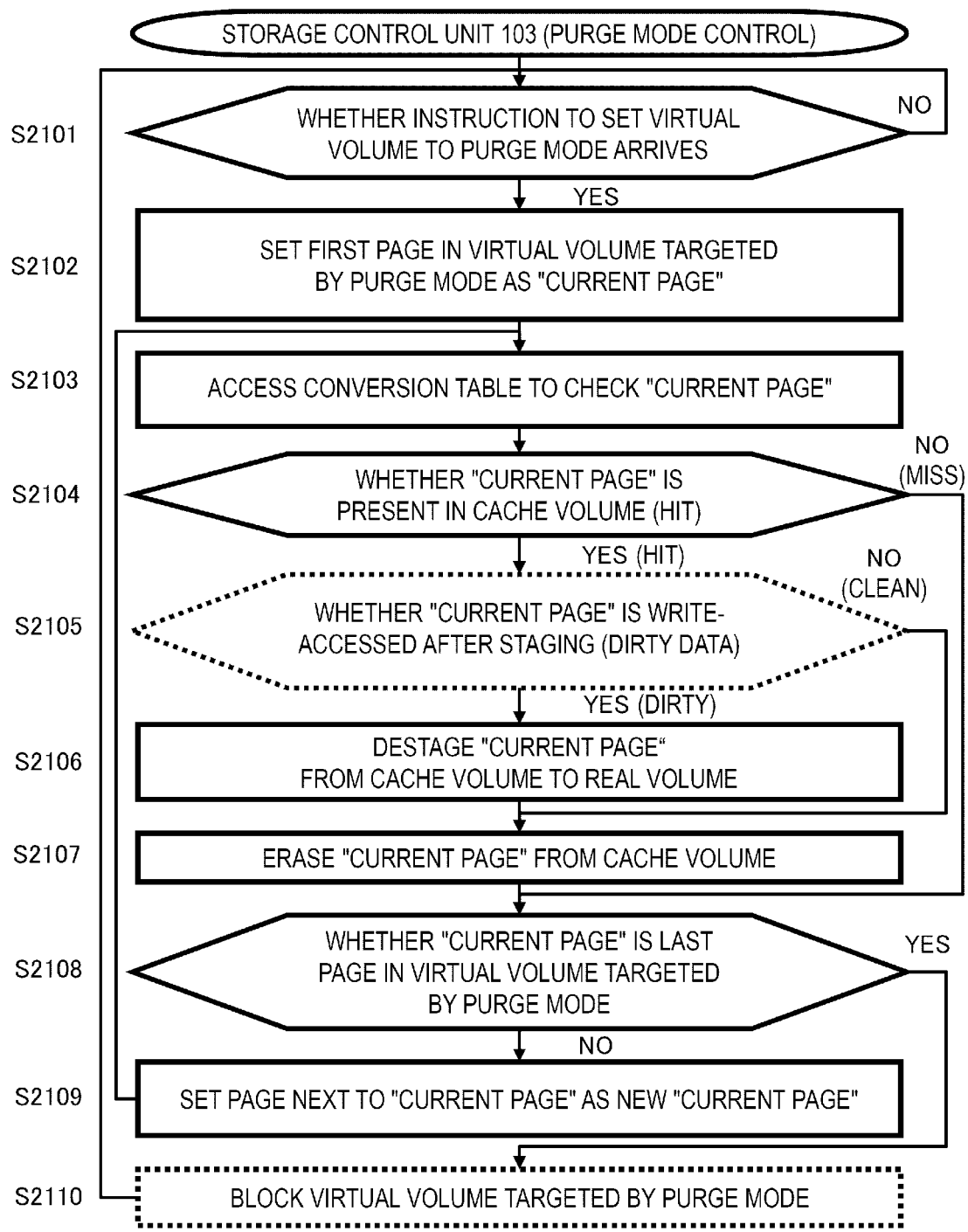
FIG. 21 shows a flowchart of purge mode control of the storage control unit.

FIG. 21 shows a group of steps executed by the storage control unit 103 when the "purge mode" is specified as the operation mode 108. Each step in FIG. 21 may be regarded as one storage control step.

In step 2101 in FIG. 21, the storage control unit 103 determines whether there is arrival of an instruction specifying the "purge mode" for the "current phase of processing" (workflow entity) or the virtual volume 104 (or the cache volume 105) associated with the "current phase of processing" as the operation mode instruction 252 from the storage management unit 251. While a determination result in step 2101 is negative, step 2101 may be repeated. On the other hand, in step 1602, when the storage management unit 251 transmits the operation mode instruction 252 instructing the "purge mode" to the storage control unit 103, the determination result in step 2101 is positive, and the control transitions to step 2102.

In step 2102 in FIG. 21, the storage control unit 103 sets a first page in the virtual volume 104 targeted by destaging by the "purge mode" as a "current page" in the purge mode control according to FIG. 21.

In step 2103 in FIG. 21, the storage control unit 103 accesses the conversion table 231 (or the conversion table 2000) and acquires information on the "current page".

In step 2104 in FIG. 21, the storage control unit 103 determines whether the cache volume page 1902 corresponding to the "current page" is present in the cache volume 105 (whether there is a cache hit) based on the information in the conversion table 231 (or the conversion table 2000). When there is a cache volume page 1902 corresponding to the "current page" (cache hit), the control transitions to step 2105. When there is no cache volume page 1902 corresponding to the "current page" (cache miss hit), the control transitions to step 2108.

In step 2105 in FIG. 21, (when the "current page" is cache-hit,) after the cache volume page 1902 corresponding to the "current page" is staged from the real volume page 1901, the storage control unit 103 may determine whether the write access to the cache volume page 1902 is executed (whether the cache volume page 1902 is dirty data). In order to enable this determination, the conversion table 231 (or the conversion table 2000) may include a dirty flag indicating presence or absence of a write access for each page. When a determination result in step 2105 is positive (when the page is dirty data), the control transitions to step 2106. When the determination result in step 2105 is negative (when the page is clean data instead of dirty data), the control may transition to step 2107.

In step 2106 in FIG. 21, (when the cache volume page 1902 corresponding to the "current page" is dirty data,) the storage control unit 103 destages the cache volume page 1902 corresponding to the "current page" to the real volume page 1901. A state of the destaging is as already shown in the central portion in FIG. 5.

In step 2106 in FIG. 21, the storage control unit 103 may destage the cache volume page 1902 corresponding to the "current page" to the real volume page 1901 without distinguishing whether the page is dirty data. In this case, when a determination result in step 2104 is positive (when there is a cache hit), the control may transition to step 2106 without executing step 2105. If such control is performed, the conversion table 231 (or the conversion table 2000) does not require the dirty flag indicating the presence or absence of the write access for each page.

In step 2107 in FIG. 21, (after the destaging related to the "current page" is completed as necessary,) the storage control unit 103 erases the cache volume page 1902 corresponding to the "current page" from the cache volume 105.

In step 2108 in FIG. 21, the storage control unit 103 determines whether the "current page" is a last page in the virtual volume 104 to be destaged by the "purge mode".

When a determination result in step 2108 is positive, the control transitions to step 2110. When the determination result in step 2108 is negative, the control transitions to step 2109.

In step 2109 in FIG. 21, the storage control unit 103 sets a page subsequent to the "current page" in the virtual volume 104 targeted by destaging by the "purge mode" as a new "current page". That is, a page targeted by destaging is moved to the next page. After step 2109, the control returns to step 2103.

In step 2110 in FIG. 21, (when all pages in the virtual volume 104 targeted by destaging by the "purge mode" are handled by the purge mode control,) the storage control unit 103 may block the virtual volume 104 targeted by destaging by the "purge mode". Alternatively, the storage control unit 103 may not block the virtual volume 104 targeted by the destaging by the "purge mode". The storage control unit 103 may block only the cache volume 105 without blocking the virtual volume 104. After step 2110, the control returns to step 2101.

5.5. Remaining Control of Workflow Management (FIG. 10)

Returning to the description of FIG. 10, in step 1005 in FIG. 10, the workflow management unit 212 determines whether there is a notification of completion of the "current phase of processing" (based on step 1703) from the service execution unit 213. While a determination result in step 1005 is negative, step 1005 may be repeated. When the determination result in step 1005 is positive, the control transitions to 1006.

In step 1006 in FIG. 10, the workflow management unit 212 determines whether all of the processing related to the workflow described in the workflow information 207 is completed. When a determination result in step 1006 is positive, the control related to the workflow information 207 by the workflow management unit 212 is completed. When the determination result in step 1006 is negative, the control transitions to step 1007.

In step 1007 in FIG. 10, the workflow management unit 212 sets a phase to be executed next as a new "current phase of processing". At this time, the point information in the workflow information 207 may be used. After step 1007, the control returns to step 1003.

6. Others (Modifications)

The disclosure is not limited to the above-described embodiment and includes various modifications. A part of the configuration or processing in the embodiment may be replaced with a configuration or processing in another conceivable embodiment. A configuration or processing of another conceivable embodiment may be added to the configuration or processing in the embodiment.

For example, in the disclosure, there may be the following modifications of the embodiment.
(1) Combination of Hybrid Cloud In the above embodiment, the system 100 that executes the access via the virtual volume is a public cloud, and the other system 190 that includes the real volume is an on-premise environment or a private cloud.

However, the disclosure can be widely applied to any storage system constructed between systems interconnected by a network. For example, the system 100 that executes the access via the virtual volume may be an on-premise environment or a private cloud, and the other system 190 that includes the real volume may be a public cloud. The system 100 that executes the access via the virtual volume may be a first on-premise environment or a first private cloud, and the other system 190 that includes the real volume may be a second on-premise environment or a second private cloud. Further, the system 100 that executes the access via the virtual volume may be a first public cloud, and the other system 190 that includes the real volume may be a second public cloud.

As described above, the disclosure can be widely applied.
(2) Variation of Cache Control In the above-described embodiment, the operation mode 108 other than the "purge mode" defines the processing performed when the page including the access target data is absent in the cache volume 105 (in the case of the cache miss hit). When the page including the data to be accessed is present in the cache volume 105 (in the case of the cache hit), the read access or the write access to the hit cache volume page 1902 is executed regardless of the operation mode 108.

In a modification, even in the case of the cache hit, contents of control may be defined by setting of the operation mode 108. For example, when the "remote mode" or the "OFF mode" for the read access is set, cache hit determination using the conversion table 231 may not be performed at the time of the read access. Alternatively, in the same case, if there is a cache hit at the time of the read access, the hit cache volume page 1902 may be erased, and then the read access to the real volume page 1901 may be executed.

Various variations of cache control are conceivable, and such variations can be applied to the disclosure.

According to the above-described modification, it is possible to implement flexible cache control according to usage (context) of data by processing executed in the system 100.
(3) Virtual Computer Environment (FIG. 22)

Various servers, nodes, functional units, and the like may be virtually implemented.

Figure 22:
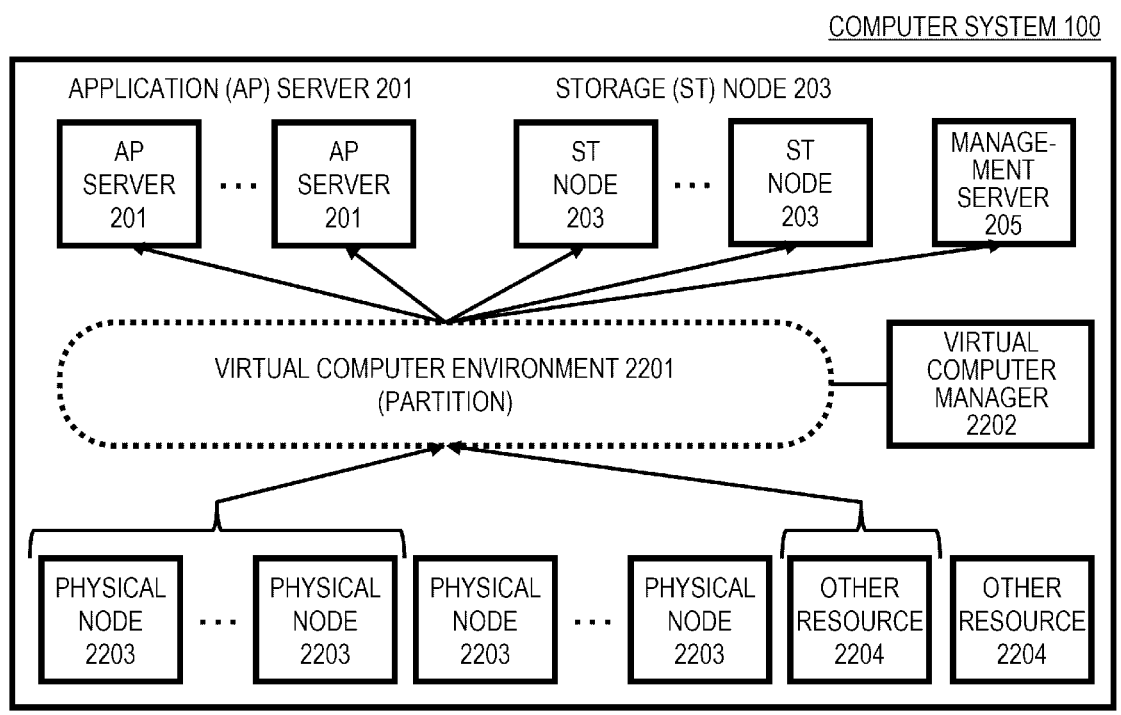
FIG. 22 shows a modification of implementation based on a virtual computer environment.

FIG. 22 shows a modification in which various servers, nodes, functional units, and the like constituting the system 100 are virtually implemented. The system 100 may include one or a plurality of physical nodes 2203 and one or a plurality of other resources 2204 as resources. The physical nodes 2203 may have the same configuration or different configurations. Similarly, the other resources 2204 may have the same configuration or different configurations.

The system 100 may include a virtual computer manager 2202. The virtual computer manager 2202 (VMM or hypervisor) may be implemented by any computer resource provided in the system 100 executing a program for implementing a virtual computer environment 2201 (partition).

Under control of the virtual computer manager 2202, one or a plurality of physical nodes 2203 and one or a plurality of other resources 2204 provided in the system 100 can be handled as virtualized resources that can be provided in the virtual computer environment 2201 (partition). Therefore, resources in the virtual computer environment 2201 (partition) are allocated to various servers, nodes, functional units (for example, each application server 201 (compute node 701), each storage node 203, and the management server 205), and the various servers, nodes, functional units, and the like can be implemented.

Here, for example, it is also possible to allocate resources of a plurality of physical nodes 2203 to one application server 201. A resource of one common physical node 2203 may be divided and allocated to a plurality of application servers 201. The same applies to the storage node 203, the management server 205, the functional units, and the like.

If the virtual computer environment is used, various virtual servers, virtual nodes, virtual functional units, and the like, which are different from configurations of resources physically provided in the system 100, can be implemented, and thus a flexible system configuration can be implemented. The other system 190 may also use the virtual computer environment.

(4) Overall Determination of Operation Mode

In the above-described embodiment, the operation mode 108 for the "current phase of processing" is determined by the group of steps executed by the operation mode determination unit 101 shown in FIG. 13.

In a modification, the operation mode determination unit 101 may collectively analyze all workflow entities such as the point information and the phase information described in the workflow information 207, and collectively determine the operation mode 108 in each processing phase.

In the above-described modification, cooperation between the workflow management unit 212 and the operation mode determination unit 101 can be reduced, and a degree of freedom in timing of determining the operation mode can be improved.

(5) Real Volume not Via Network

In the above-described embodiment, the network 180 is interposed between the system 100 and the real volume 106. In the above-described embodiment, in the storage system with the interposed network 180, it is possible to speed up an access to data stored in the real volume 106, and meanwhile, it is possible to reduce a capacity, a transfer volume, or a management cost of cached data accompanying caching of the data.

In a modification, the network 180 may not be interposed between the system 100 and the real volume 106. For example, the system 100 may include the real volume 106.

In the above-described modification, when there is a sufficient difference between a data transfer capability of a storage apparatus (or recording apparatus) for implementing the cache volume 105 and a data transfer capability of a storage apparatus (or recording apparatus) for implementing the real volume 106 as viewed from (the service execution unit 213 of) the processing execution unit 102 that is a subject of an access to data, the modification can have the same operational effects as those of the above-described embodiment. In the above-described modification, for example, the storage apparatus implementing the cache volume 105 may be a memory such as SRAM or DRAM, and the storage apparatus (or recording apparatus) implementing the real volume 106 may be a hard disk drive (HDD) or a flash memory.

(6) Separation of Application Server and Storage Server

In the above-described embodiment, the system 100 includes the application server 201, which includes the operation mode determination unit 101 and the processing execution unit 102, and the storage node 203, which includes the cache volume 105 and the storage control unit 103. By adopting such a configuration in the system 100, a data access (access request 109) via the virtual volume 104 and the operation mode instruction 252 can be quickly executed in the system 100.

In a modification, a computer system including the application server 201 which includes the operation mode determination unit 101 and the processing execution unit 102 may be a system different from the system 100 including the storage node 203 which includes the cache volume 105 and the storage control unit 103. In this modification, the data access (access request 109) via the virtual volume 104 and the operation mode instruction 252 are transmitted between different computer systems. Such a modification is available as long as delay due to transmission between different computer systems is allowable.

As described above, the disclosure is applicable regardless of arrangement of the operation mode determination unit 101, the processing execution unit 102, the cache volume 105, and the storage control unit 103.

(7) Variation of Operation Mode Information and Operation Mode Instruction

In the above-described embodiment, the content of the information transmitted (notified of) from the operation mode determination unit 101 (via the storage management unit 251 as necessary) to the storage control unit 103 is the operation mode 108. The storage control unit 103 performs control related to the cache volume 105 suitable for the transmitted (notified) operation mode 108.

In a modification, either the operation mode determination unit 101 or the storage management unit 251 may specify the control content for the cache volume 105 suitable for the operation mode 108. Either the operation mode determination unit 101 or the storage management unit 251 may directly or indirectly transmit (notify the storage control unit 103 of) information indicating the specified control content to the storage control unit 103.

In the above-described modification, the storage control unit 103 does not need to determine the control content related to the cache volume 105 suitable for the operation mode 108, and thus it is possible to reduce resources of hardware or software related to the storage control unit 103.

(8) Control Related to Cache Volume without Purge Mode

In the above-described embodiment, the purge mode is provided as one operation mode 108 for control related to the cache volume 105.

In a modification, the purge mode may not be provided as one operation mode 108 for control related to the cache volume 105. For example, when the target data of the access request 109 is miss-hit in the cache volume 105, only an operation mode in which the miss-hit data (and a page including the data) is staged from the real volume 106 to the cache volume 105 (an operation mode in which data read from the real volume 106 is retained in the cache volume 105) and an operation mode in which the data is not staged (an operation mode in which data read from the real volume 106 is not retained in the cache volume 105) may be provided as candidates for the operation mode 108.

In the above-described modification, it is still possible to reduce the capacity of cached data, reduce the data transfer volume for caching, and reduce the cost of managing cached data.

The technical matters described in the embodiment of the disclosure and the modifications of the embodiment as described above can be appropriately combined as long as technical contradiction does not occur.

What is claimed is:

1. A computer system comprising:
a storage control unit; and
a storage apparatus, wherein
the storage control unit is configured to
provide a virtual volume to a processing execution unit configured to execute an application,
manage data input to and output from a real volume via the virtual volume,
implement a cache volume based on a storage area of the storage apparatus, receive a notification of information on an operation mode determined by an operation mode determination unit based on processing executed by the processing execution unit, when an access request is received via the virtual volume from the processing execution unit, in a case where target data of the access request is not stored in the cache volume, execute an access to the real volume for the target data, and control the cache volume based on the notified information on the operation mode, wherein the operation mode determination unit determines the operation mode for each phase of the processing in a workflow indicating the processing.

2. A computer system comprising:

a storage control unit; and a storage apparatus, wherein the storage control unit is configured to provide a virtual volume to a processing execution unit configured to execute an application, manage data input to and output from a real volume via the virtual volume, implement a cache volume based on a storage area of the storage apparatus, receive a notification of information on an operation mode determined by an operation mode determination unit based on processing executed by the processing execution unit, when an access request is received via the virtual volume from the processing execution unit, in a case where target data of the access request is not stored in the cache volume, execute an access to the real volume for the target data, and control the cache volume based on the notified information on the operation mode, wherein the operation mode determination unit determines the operation mode based on an operation mode explicitly indicated by workflow information describing a workflow indicating the processing, an attribute of a service executed by the processing execution unit, or an attribute of the virtual volume accessed by the processing execution unit.

3. A computer system comprising:

a storage control unit; and a storage apparatus, wherein the storage control unit is configured to provide a virtual volume to a processing execution unit configured to execute an application, manage data input to and output from a real volume via the virtual volume, implement a cache volume based on a storage area of the storage apparatus, receive a notification of information on an operation mode determined by an operation mode determination unit based on processing executed by the processing execution unit, when an access request is received via the virtual volume from the processing execution unit, in a case where target data of the access request is not stored in the cache volume, execute an access to the real volume for the target data, and control the cache volume based on the notified information on the operation mode, wherein when the access request is received from the processing execution unit, the storage control unit controls whether to retain data read from the real volume in the cache volume based on the notified information on the operation mode, and wherein the storage control unit deletes data stored in the cache volume in response to the notification of the information on the predetermined operation mode, and stores, in the real volume, dirty data not stored in the real volume when deleting the data.

4. A computer system comprising:

a storage control unit; and a storage apparatus, wherein the storage control unit is configured to provide a virtual volume to a processing execution unit configured to execute an application, manage data input to and output from a real volume via the virtual volume, implement a cache volume based on a storage area of the storage apparatus, receive a notification of information on an operation mode determined by an operation mode determination unit based on processing executed by the processing execution unit, when an access request is received via the virtual volume from the processing execution unit, in a case where target data of the access request is not stored in the cache volume, execute an access to the real volume for the target data, and control the cache volume based on the notified information on the operation mode, wherein when the access request is received from the processing execution unit, the storage control unit controls whether to retain data read from the real volume in the cache volume based on the notified information on the operation mode, and wherein the storage control unit does not retain, in the cache volume, data read from the real volume related to a read access or a write access in an operation mode when the processing execution unit executes a catalog service, does not retain, in the cache volume, data read from the real volume related to a read access and retains, in the cache volume, data read from the real volume related to a write access, in an operation mode when the processing execution unit executes an ETL service, retains, in the cache volume, data read from the real volume related to a read access or a write access in an operation mode when the processing execution unit executes an analysis service, and does not retain, in the cache volume, data stored in the cache volume in an operation mode when the processing execution unit executes a model output service.

5. A computer system comprising:

a storage control unit; and a storage apparatus, wherein the storage control unit is configured to provide a virtual volume to a processing execution unit configured to execute an application, manage data input to and output from a real volume via the virtual volume, implement a cache volume based on a storage area of the storage apparatus, receive a notification of information on an operation mode determined by an operation mode determination unit based on processing executed by the processing execution unit, when an access request is received via the virtual volume from the processing execution unit, in a case where target data of the access request is not stored in the cache volume, execute an access to the real volume for the target data, and control the cache volume based on the notified information on the operation mode, wherein when the access request is received from the processing execution unit, the storage control unit controls whether to retain data read from the real volume in the cache volume based on the notified information on the operation mode, and wherein the storage control unit does not retain, in the cache volume, data read from the real volume related to a read access or a write access in an operation mode when the processing execution unit accesses a catalog volume, does not retain, in the cache volume, data read from the real volume related to a read access and retains, in the cache volume, data read from the real volume related to a write access, in an operation mode when a volume accessed by the processing execution unit is in a virtual lake, retains, in the cache volume, data read from the real volume related to a read access or a write access in an operation mode when a volume accessed by the processing execution unit is in a virtual mart, retains, in the cache volume, data read from the real volume related to a read access or a write access in an operation mode when the processing execution unit accesses a work volume, and does not retain, in the cache volume, data stored in the cache volume in an operation mode when a volume to which the processing execution unit is related is a model volume.

6. A computer system comprising:

a storage control unit; and a storage apparatus, wherein the storage control unit is configured to provide a virtual volume to a processing execution unit configured to execute an application, manage data input to and output from a real volume via the virtual volume, implement a cache volume based on a storage area of the storage apparatus, receive a notification of information on an operation mode determined by an operation mode determination unit based on processing executed by the processing execution unit, when an access request is received via the virtual volume from the processing execution unit, in a case where target data of the access request is not stored in the cache volume, execute an access to the real volume for the target data, and control the cache volume based on the notified information on the operation mode, wherein the processing execution unit includes a workflow management unit and a service execution unit, the workflow management unit manages a workflow based on workflow information in which a workflow indicating the processing is described, and manages the service execution unit, and the service execution unit executes a service in the processing, and wherein the workflow information includes, for each phase of the processing, information for specifying a service corresponding to the phase or information for specifying data input and output in the phase.

* * * * *